US012687915B2

(12) United States Patent
Panshin

(10) Patent No.: US 12,687,915 B2
(45) Date of Patent: Jul. 21, 2026

(54) SECURE CONTROLLERS FOR REPLACEABLE PRINT APPARATUS COMPONENTS

(71) Applicant: HEWLETT-PACKARD DEVELOPMENT COMPANY, L.P., Spring, TX (US)

(72) Inventor: Stephen D. Panshin, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 19/181,119

(22) Filed: Apr. 16, 2025

(65) Prior Publication Data

US 2025/0264930 A1     Aug. 21, 2025

Related U.S. Application Data

(63) Continuation of application No. PCT/US2023/029153, filed on Jul. 31, 2023.

(51) Int. Cl.
*G06F 1/32* (2019.01)
*B41J 2/045* (2006.01)
(Continued)

(52) U.S. Cl.
CPC .......... *G06F 1/3284* (2013.01); *B41J 2/0457* (2013.01); *G05F 1/70* (2013.01)

(58) Field of Classification Search
None
See application file for complete search history.

(56) References Cited

U.S. PATENT DOCUMENTS 5,083,266 A * 1/1992 Watanabe ............. G06F 1/3215
                                                             713/323
9,619,663 B2 * 4/2017 Refstrup ............ G03G 15/0863
(Continued)

FOREIGN PATENT DOCUMENTS

EP          4012593 A1    6/2022
WO     2020/117196 A1    6/2020

OTHER PUBLICATIONS

Galbally, Javier, "A new Foe in biometrics: a narrative review of side-channel attacks", Computers & Security, vol. 96, May 2020, 12 pages.

*Primary Examiner* — Jaweed A Abbaszadeh
*Assistant Examiner* — Cheri L Harrington
(74) *Attorney, Agent, or Firm* — Foley & Lardner LLP

(57) ABSTRACT

Disclosed herein is a secure controller for a replaceable print apparatus component, circuitry for association with a replaceable print apparatus component, and a replaceable print apparatus component. The secure controller is to perform secure communication with a host apparatus via a serial data bus. The controller further is to, in response to a first command from the host apparatus, execute a first operation associated with the first command, wherein the controller is to consume power within a first range during execution of the first operation. The controller also is to, in response to a second command from the host apparatus specifying a dwell time, transition to a low-power state and consume power within a second range in the low-power state for a duration based on the dwell time, the second range being below and spaced apart from the first range.

19 Claims, 8 Drawing Sheets

(51) Int. Cl.
 B41J 2/45 (2006.01)
 G05F 1/70 (2006.01)
 G06F 1/3234 (2019.01)

(56) References Cited

U.S. PATENT DOCUMENTS

| | | | | |
|---|---|---|---|---|
| 11,409,487 B2* | 8/2022 | Gardner | ............... | G06F 3/1221 |
| 11,539,851 B2* | 12/2022 | Hikichi | ............. | H04N 1/00896 |
| 11,803,229 B1* | 10/2023 | Yung | ......................... | G06F 1/28 |
| 2015/0021997 A1* | 1/2015 | Smith | .................... | G08B 17/10 |
| | | | | 307/38 |
| 2017/0075610 A1* | 3/2017 | Choi | ..................... | G06F 1/3275 |
| 2020/0106909 A1* | 4/2020 | Hashimoto | ............ | H04N 1/001 |
| 2020/0174963 A1* | 6/2020 | Panshin | ............. | H04N 1/00214 |
| 2021/0303053 A1* | 9/2021 | Lake | .................... | G06F 1/3206 |
| 2021/0334391 A1* | 10/2021 | Gardner | .............. | B41J 2/17546 |
| 2021/0334392 A1* | 10/2021 | Panshin | .............. | B41J 2/17546 |
| 2021/0402785 A1* | 12/2021 | Panshin | .............. | B41J 2/17546 |
| 2022/0263351 A1* | 8/2022 | Yang | .................... | H02J 50/402 |
| 2022/0269298 A1* | 8/2022 | Rapaka | .................... | G06F 1/28 |
| 2023/0236652 A1* | 7/2023 | Moshe | ................. | G06F 1/3203 |
| | | | | 713/320 |
| 2024/0095410 A1 | 3/2024 | Loubet et al. | | |

* cited by examiner

700

702 — Wake-up from standby mode to receive command sent by host to address associated with logic 704 — Type of command?

Transition to first power mode for executing operation associated with received command

706

Transition to second power mode for executing operation associated with received command

708

SECURE CONTROLLERS FOR REPLACEABLE PRINT APPARATUS COMPONENTS

CROSS-REFERENCE TO RELATED APPLICATIONS

The present application is a Bypass Continuation of International Patent Application No.: PCT/US2023/029153, filed Jul. 31, 2023, which is incorporated herein by reference in its entirety.

BACKGROUND

Serial data bus protocols such as Inter-integrated Circuits ($I^2C$, or I2C, which notation is adopted herein) protocol and Serial Peripheral Interface (SPI) protocol allow at least one 'primary' (or 'host' or 'leader', previously sometimes also referred to as 'master') integrated circuit (IC) to communicate with at least one 'secondary' IC (or 'peripheral' or 'component' IC, previously sometimes also referred to as 'slave' IC), for example via a bus. I2C, and other communications protocols, communicate data according to a clock period. For example, a voltage signal may be generated, where the value of the voltage is associated with data. For example, a voltage value above x may indicate a logic "1" whereas a voltage value below x volts may indicate a logic "0", where x is a predetermined numerical value. By generating an appropriate voltage in each of a series of clock periods, data can be communicated via a bus or another communication link.

Some 2D and 3D printing systems include one or more replaceable print apparatus components, such as print material cartridges or containers (e.g., inkjet cartridges, toner cartridges, ink supplies, build material supplies etc.), inkjet printhead assemblies, and the like. In some examples, circuitry (e.g., a controller) associated with the replaceable print apparatus component(s) communicate with host/printer-side circuitry of the print apparatus in which they are installed, for example communicating information such as their identity, capabilities, status and the like.

In some examples, these communications utilize I2C communications. In such examples, the 'primary' IC may generally be provided as part of the print apparatus (which may be referred to as the 'host') and a replaceable print apparatus component would comprise a 'secondary' IC, although this need not be the case in all examples. There may be a plurality of secondary ICs connected to an I2C communication link (for example, containers of different colors of print agent). The secondary IC(s) may comprise circuitry to perform data operations and to respond to requests from host/printer-side circuitry of the print system.

In some examples, it may be intended to detect the physical location of secondary devices that are attached along a serial bus. It may, for example, be intended that devices such as replaceable print apparatus components occupy a certain designated physical position within a print apparatus. For example, in a printing apparatus with ink or toner supply devices attached to a serial bus, there may be an expected position for, for example, a black cartridge, a yellow cartridge, a cyan cartridge and a magenta cartridge, each of which may have a particular address under a communications protocol. By detecting whether specific color cartridges have been misinstalled or swapped, printing with incorrect or unintended colors may be prevented. Prior patent disclosure are US patent application publication number US 2011/0029705 as well as international patent application publication Nos. WO 2020/117196 and WO 2020/117297, all of which are incorporated herein by reference in their entirety and for all purposes.

BRIEF DESCRIPTION OF DRAWINGS

In the following, a detailed description of various examples is given with reference to the figures. The figures show schematic illustrations of FIG. 1: a printing system according to an example.

DETAILED DESCRIPTION

Figure 1:
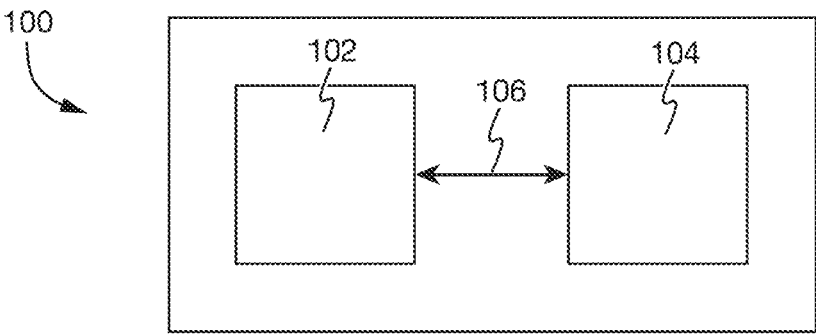

Some examples of applications of serial data bus communications such as I2C communications are described herein in the context of print apparatuses. However, not all the examples are limited to such applications, and at least some of the principles set out herein may be used in other contexts, for example in combination with other host apparatuses.

In some examples, host/printer-side circuitry within a print apparatus may receive information from circuitry associated with a replaceable print apparatus component via a communications interface, and/or may send commands to the replaceable print apparatus component. Example print apparatuses include two-dimensional imaging apparatuses and three-dimensional additive manufacturing apparatuses such as inkjet printers, dry toner printers, liquid toner printers, 3D powder bed inkjet printers, etc. Example replaceable print apparatus components include ink tanks; ink bottles; printheads; inkjet printhead cartridges; dry toner reservoirs; dry toner cartridges; photoconductor cartridges; process cartridges; liquid toner reservoirs; three-dimensional printing agents including inks, stimulating agents, adhesives, inhibitors, etc.; three-dimensional printing build material; print apparatus service components; and/or any other component that may be replaceable with respect to a host print apparatus and may or may not contain print material. In this disclosure, print material or print agent may include ink, dry or liquid toner, three-dimensional printing agents, three-dimensional build material (plastics, metal, etc.), fibers, etc. The reservoirs mentioned above may contain a colored print material. Print apparatuses and components may also be used for high precision dispensing or propelling fluids for other applications, for example digital titration, forensic applications, bio-fluids, diagnostics, etc.

Communications between print apparatuses and replaceable print apparatus components installed in the apparatus may provide various functions. For example, the identity, functionality and/or status of a replaceable print apparatus component and/or the circuitry associated therewith may be communicated to host/printer-side circuitry of a print apparatus via a communications interface. For example, a logic circuit associated with (or provided on or in) a print agent container may communicate an identity such as a product serial number and/or a brand, and/or identifying characteristics such as color, color map, color map reconstruction recipe, maximum print agent volume, or functionality to a print apparatus in which it is installed, see for example European patent publication No. EP 0 941 856. A status, such as a fill level, may be provided via a communications interface, for example such that a print apparatus may generate an indication of the fill level to a user.

In some examples, communications between print apparatuses and replaceable print apparatus components utilize secure communications, which may involve cryptographic operations, e.g., to encrypt, authenticate or sign messages or to decrypt or validate messages. Such cryptographic operations may involve the use and/or computation of keys (e.g., secret or private keys) and/or running cryptographic algorithms. For example, a validation process may be carried out by a print apparatus. The print apparatus may, e.g., verify that a replaceable print apparatus component originates from an authorized source, so as to ensure the quality thereof. For example, circuitry associated with a replaceable print apparatus component may store secret keys and may be configured to generate session keys, session key identifiers and/or message authentication codes (MACs) for generating authenticated cryptographic responses to the printer, see for example international patent application No. WO2009/145774A1. The logic may also include further authentication mechanisms such as dedicated hardware for calculating responses within predefined, relatively short, time windows, see for example U.S. Pat. No. 9,561,662. In some examples, the validation process may include an integrity check to ensure that the replaceable print apparatus component and/or the circuitry associated therewith is functioning as expected. Logic circuitry may be placed in/on the print apparatus component and print apparatus, which circuitry is configured to execute one or more of those cryptographic operations. Such circuitry of the print apparatus component may be referred to as secure microcontroller or secure controller.

Attackers attempting to obtain keys may not only try to read out or extract keys from the circuitry or the communications directly but may additionally or alternatively also employ so-called side-channel attacks. These attacks exploit additional information associated with cryptographic operations such as timing information, power consumption, electromagnetic leaks, or sound to recover keys. For example, a supply current of the circuitry may be monitored for deducing information on keys being used by the circuitry. As a counter measure, various defense mechanisms such as active current regulation may be employed to eliminate information leakage via such channels. This may lead to an increased power consumption of the circuitry.

In at least some of the examples described below, circuitry for use with a replaceable print apparatus component is described. The circuitry may be for association with (or associated with) a replaceable print apparatus component, for example being (or to be) arranged on and/or in the replaceable print apparatus component, e.g., affixed or adhered thereto, arranged at least partially within a housing thereof or integrated with the replaceable print apparatus component.

The circuitry (which may also be referred to as 'logic' or 'logic circuitry' herein) may comprise an electronic circuit such as a logic circuit. The electronic circuit may, e.g., be provided as an integrated circuit. The circuitry may be provided as a circuitry package (logic circuitry package), meaning that the circuitry may be interconnected and/or fixed together, for example supported by a substrate such as a PCB and/or support wall (e.g., of the print apparatus component). In some examples, the circuitry may comprise a plurality of electronic circuits that may be interconnected or communicatively linked to each other. Where more than one circuit is provided, these may be encapsulated as a single unit, or may be separately encapsulated, or not encapsulated, or some combination thereof. Each circuit or package may be configured to communicate via a serial bus interface.

In some examples, the circuitry may be, or may function as, a controller such as a microcontroller. The controller may, e.g., comprise a processor and a memory, wherein the memory may store instructions for execution by the processor to provide the functionality described herein. In some examples, the controller (or circuitry) may be to provide certain functionality of or for the replaceable print apparatus component, for example communication capability to perform communication with a host, e.g., a host apparatus such as a printing apparatus (for example, receive commands from the host or provide responses to the host), processing capability to process and respond to commands from the host, and/or controlling capability to control other elements of the replaceable print apparatus component (for example to perform an action or task such as a printing task or print material level sensing). In some examples, the controller may be to operate (e.g., control operation of) the replaceable print apparatus component or a part thereof.

The circuitry (for/of the replaceable print apparatus component) may be to perform communication with a host apparatus such as a print apparatus via a serial data bus (e.g., an I2C serial data bus). The serial data bus may for example be provided as part of the host apparatus. The circuitry may be adapted to communicate data with host apparatus circuitry such as a host apparatus controller (e.g. a print apparatus controller) via the serial data bus. In some examples, the circuitry (for/of the replaceable print apparatus component) may respond to various types of commands (or requests) from a host apparatus (e.g., a print apparatus). A command may comprise a request for data, for example identification and/or authentication information (for example, a 'read' request). In other examples, a command may comprise a 'write' request. Another command from a host may be a request to perform an action, such as performing at least one measurement or carrying out a printing task or the like. Another type of request may be a request for a data processing action. In an example of an interaction, a host may send a command to circuitry associated with a replaceable print apparatus component, which may perform an operation associated with the command and load resulting data into a memory (in some examples, into a buffer and/or a specific register of a memory). A host may send a further command to read the response, whereby the response is transmitted as serial data over a connected bus. Such a process could be used, for example, to acquire data held in a memory of the logic circuitry package. For example, the first command may be a request for an identifier of that package, and may result in the package loading the identifier into a memory buffer. A subsequent 'read' request may result in the data being read out of the buffer and transmitted as a serial data signal.

In some examples, the circuitry (e.g., controller) may be to perform secure communication with the host apparatus and may thus also be referred to as secure circuitry (e.g., secure controller). "Secure communication" as the term is used herein may for example comprise communication by authenticated and/or encrypted messages (e.g., commands), e.g., messages that allow for verification of an identity of the sending entity and/or whose content is protected from unauthorized access. Secure communication may involve cryptographic operations such as authenticating, signing, encrypting, validating, decrypting, hashing, generating random numbers, generating keys, using keys, storing keys and the like.

In at least some examples, a plurality of such circuitry (each of which may be associated with a different replaceable print apparatus component) may be connected to a same serial data bus, e.g., a common I2C bus. Each circuitry may be associated with a respective address and may, e.g., be to respond to commands sent by the host over the serial data bus to the corresponding address.

At least some of the examples described herein may for example allow for lowering power consumption. In particular, at least some of the examples described herein may allow for reducing power consumption without compromising security (e.g., by inhibiting or complicating side-channel attacks). Additionally or alternatively, at least some of the examples described herein may allow for performing an integrity check on a replaceable print apparatus component and/or circuitry associated therewith, e.g. to verify timer and/or regulator functions (for example (analog) power regulator functions) of the component circuitry. Additionally or alternatively, at least some of the examples described herein may allow for properly connecting (e.g., via secure communication) to a host apparatus such as a print apparatus and for passing integrity checks conducted by the host apparatus.

FIG. 1 shows a schematic illustration of a printing system 100 according to an example. The printing system 100 comprises a print apparatus 102 (as an example of a host apparatus) in communication with a replaceable print apparatus component 104 via a communications link 106. Although for clarity, the replaceable print apparatus component 104 is shown as external to the print apparatus 102, in some examples, the replaceable print apparatus component 104 may be housed within the print apparatus. The print apparatus 102 may be any type of host, including 2D print apparatus or 3D print apparatus.

The replaceable print apparatus component 104 may for example contain a consumable resource of the print apparatus 102, or a component which is likely to have a lifespan which is less (in some examples, considerably less) than that of the print apparatus 102. For example, the print apparatus component 104 may physically store ink, toner, 3D print agent or 3D print build powder and may be intended to be replaced after substantial exhaustion. The replaceable print apparatus component 104 may for example comprise a print material cartridge (print material container), which may, e.g., be a build material container for 3D printing, or a liquid print agent container for 2D or 3D printing. In some examples the replaceable print apparatus component 104 may comprise a print head or other dispensing component. While a single replaceable print apparatus component 104 is shown in this example, in other examples, there may be a plurality of replaceable print apparatus components, for example comprising print agent containers of different colors, print heads (which may be integral to the containers), or the like.

In some examples, the communications link 106 may be or comprise a serial bus, for example a serial data bus such as an I2C capable or compatible serial data bus (herein after, an I2C bus). The serial bus may comprise a plurality of lines (e.g., wires) such as a communication line (e.g. a data line and/or a clock line) and/or a power supply line (e.g. a voltage source or power line and/or a ground line), for example as detailed below with reference to FIG. 8. Correspondingly, the print apparatus and print apparatus component are provided with serial bus communications interfaces (i.e., links) to connect.

Figure 2:
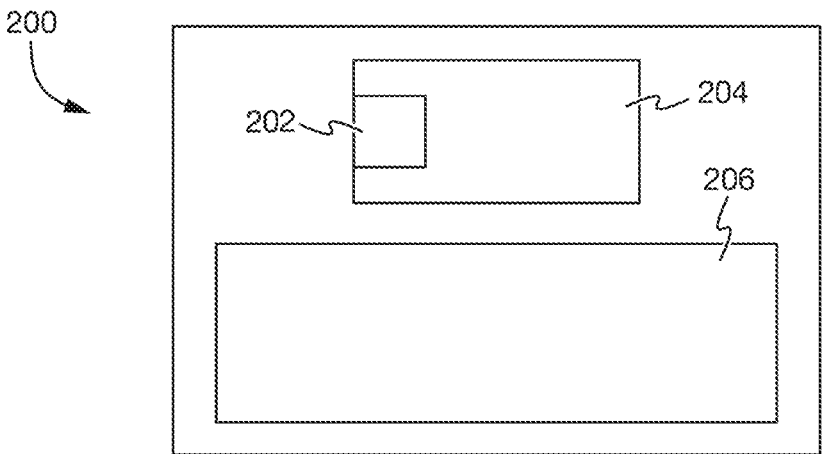
FIG. 2: a replaceable print apparatus component with circuitry associated therewith according to an example.

FIG. 2 shows a schematic illustration of a replaceable print apparatus component 200 according to an example, which may, e.g., provide the replaceable print apparatus component 104 of FIG. 1. The replaceable print apparatus component 200 comprises a communications interface 202 to communicate with a host (e.g., a print apparatus) over a communications link such as the communications link 106. The communications interface 202 may be or comprise a serial data bus interface that is to interface with a serial data bus, e.g., an I2C interface for communication over an I2C bus. The serial bus interface may for example comprise respective contacts for the lines of the serial data bus, for example, a data, clock, power and ground contact. In some instances, power may be harvested elsewhere such as from the clock line or from a power source on circuitry 204.

In the example of FIG. 2, the communications interface 202 is provided as part of or comprised in (e.g. integrated into) circuitry 204. The circuitry 204 may be associated with the replaceable print apparatus component 200, e.g. attached thereto. As mentioned above, the circuitry 204 may for example be a secure controller and may be to perform secure communication with the host via the communications link 106. In some examples, the circuitry 204 may be provided as a secure microcontroller or a smartcard. In some examples, the circuitry 204 may be similar to circuitry 912 of FIG. 9b described below.

In use of the replaceable print apparatus component 200, the circuitry 204 may receive data (e.g., commands) via the communications interface 202 and decode the received data. In some examples, the circuitry 204 may further encode data for transmission via the data interface 202. In some examples, the circuitry 204 may be configured to act as a 'secondary' device in serial (e.g. I2C) communications.

The replaceable print apparatus component 200 in this example is a print material cartridge comprising a print material reservoir 206, which may contain any of the examples of print materials discussed above.

Figure 3:
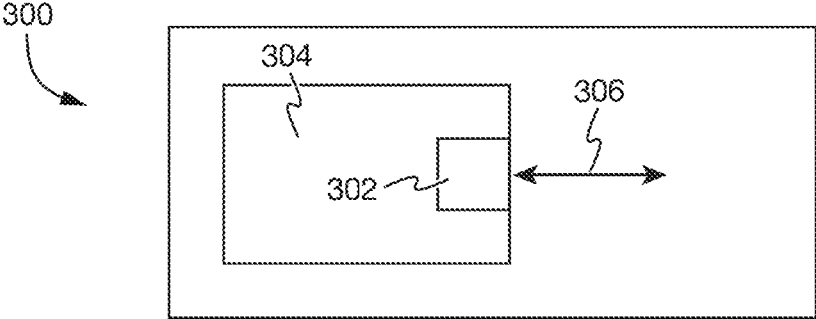
FIG. 3: a print apparatus according to an example.

FIG. 3 shows a schematic illustration of a print apparatus 300 according to an example. The print apparatus 300 may, e.g., provide the print apparatus 102 of FIG. 1. The print apparatus 300 comprises host/printer-side circuitry (e.g., a controller) 304 comprising or in communication with an interface 302 for communicating with a replaceable print apparatus component via a communications link 306 that is provided as part of the print apparatus 300 in this example. In some examples, the interface 302 is a serial data bus (e.g., I2C) interface and the communications link 306 is a serial data bus (e.g., an I2C bus), for example as described below with reference to FIG. 8.

In some examples, the print apparatus 300 (e.g., the host/printer-side circuitry or controller 304) may be configured to act as a host, or a primary device, in serial (e.g., I2C) communications. The host/printer-side circuitry or controller 304 may generate and send commands to at least one replaceable print apparatus component 200, and may receive and decode responses received therefrom. In one example, the print apparatus comprises a main print apparatus controller, e.g., ASIC, and a (host/primary-side) secure microcontroller that encrypts and decrypts communications with the print apparatus component's (peripheral/secondary-side) controller.

Such replaceable print apparatus component(s) 104, 200, circuitry 204 associated therewith, and/or print apparatuses 102, 300 may be provided (e.g., manufactured and/or sold) separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200.

Figure 4:
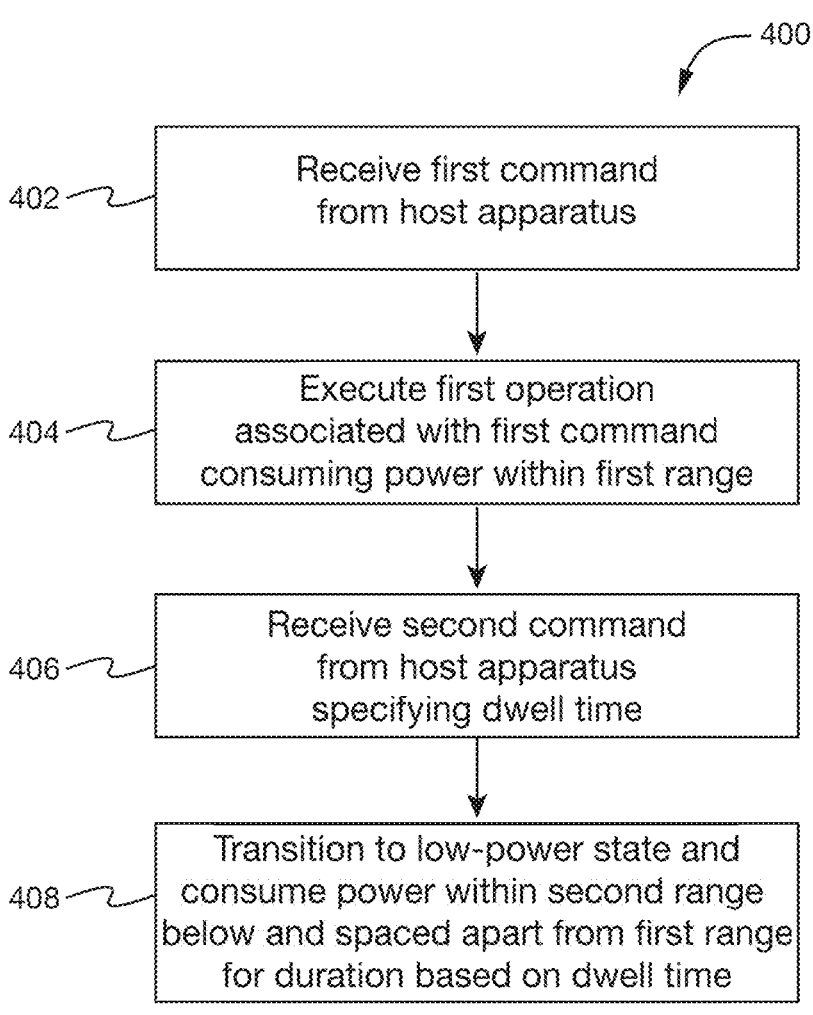
FIG. 4: a method of operating a secure controller for a replaceable print apparatus component according to an example.

FIG. 4 depicts a flow chart of a method 400 in accordance with an example. The method 400 may for example be executed by circuitry for association with a replaceable print apparatus component according to any of the examples described herein, e.g., the circuitry 204 of FIG. 2, which is used as a non-limiting example for illustration purposes in the following. In some examples, the circuitry executing the method 400 may be a secure controller for a replaceable print apparatus component, wherein the secure controller may be to perform secure communication with a host apparatus via a serial data bus, e.g., with the printing apparatus 300 of FIG. 3 via the communications link 306. The method 400 is not limited to the order of execution indicated by the flow chart in FIG. 4. As far as technically feasible, the method 400 may be executed in an arbitrary order and steps thereof may also be executed simultaneously at least in part.

In block 402, a first command is received by the circuitry 204 from a host apparatus (e.g., the print apparatus 102, 300). The first command may be received via a serial data bus such as an I2C bus. The first command may be a request for the circuitry 204 to execute a certain operation, e.g. the first operation referred to below.

In response to the first command, the circuitry 204 executes a first operation associated with the first command in block 404. The first operation may for example be a cryptographic operation. The cryptographic operation may, e.g., involve the use of a cryptographic key such as a secret or private key, which may only be known to the circuitry 204 and/or the host apparatus in some examples. The cryptographic operation may for example comprise computing and/or generating a session key, a session key identifier and/or a message authentication code for generating an authenticated cryptographic response to the host apparatus and/or for verifying an authenticated message or command from the host apparatus. Additionally or alternatively, the cryptographic operation may comprise determining a response to a cryptographic challenge, e.g., for confirming that the circuitry 204 is in possession of an appropriate key, for example to verify whether or not the circuitry 204 is authentic. A certain amount of power may be required to run these cryptographic processes.

Figure 5:
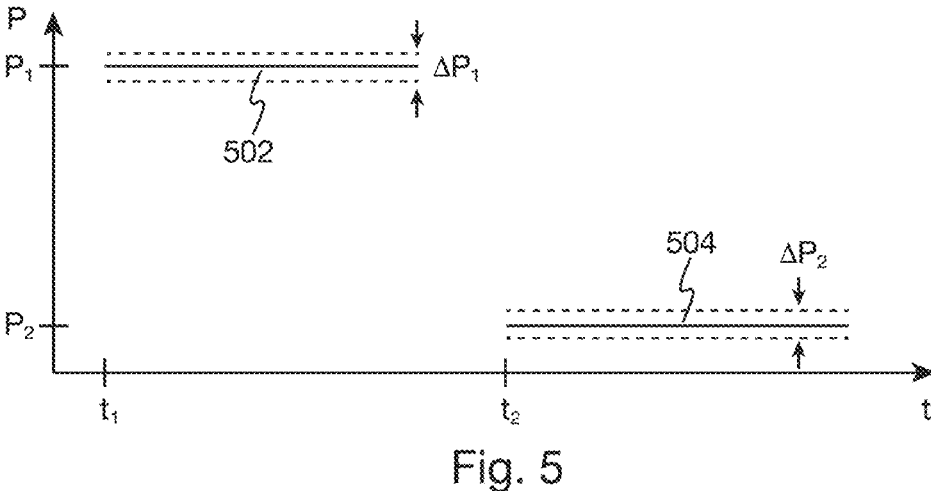
FIG. 5: a power consumption of a secure controller during execution of operations associated with commands from a host apparatus according to an example.

During execution of the first operation, the circuitry 204 consumes power within a first range, meaning that the power will vary in that first range. An example for this is illustrated schematically in FIG. 5, which depicts a power consumption P of the circuitry 204 over time t. The first command may for example be received by the circuitry 204 at a first time $t_1$. The power consumption of the circuitry 204 during execution of the first operation is illustrated by solid line 502 in FIG. 5, wherein $P_1$ denotes an average power consumption of the circuitry 204 during execution of the first operation and $\Delta P_1$ a width (which could also be referred to as height) of the first range, which is illustrated by the dashed lines below and above line 502. While straight lines 502 and 504 are illustrated in the diagram of FIG. 5, in reality it can be expected there will be many peaks and valleys within the respective range.

The width $\Delta P_1$ of the first range may for example be a peak-to-peak width (e.g., a distance between a highest peak power and a lowest valley power), a standard deviation (or multiple thereof), or a percentile range (e.g., a range between a $10^{th}$ and $90^{th}$ percentile or between a $25^{th}$ and $75^{th}$ percentile) of the power consumption of the circuitry 204 during execution of the first operation. The circuitry 204 may be to consume power (e.g., maintain the power consumption) during execution of the first operation so that the width $\Delta P_1$ of the first range (e.g., the standard deviation of the power consumption) is less than 50%, less than 30%, less than 20%, less than 15%, less than 10%, less than 5%, less than 2% or less than 1% of the average power consumption $P_1$. As used herein, the standard deviation of the power consumption (or, where applicable, of the supply current), which may be a continuously varying analog signal, may refer to the standard deviation obtained by appropriate discrete sampling of the respective quantity, wherein a sampling rate may, e.g., be between 1 kHz ($10^3$ samples per second) and 10 GHz ($10^{10}$ samples per second), in some examples between 5 kHz ($5 \cdot 10^3$ samples per second) and 100 MHz ($10^8$ samples per second) and in one example between 10 kHz ($10^4$ samples per second) and 1 MHz ($10^6$ samples per second).

The average power consumption $P_1$ of the circuitry 204 may for example be between 1 mW (milliwatt) and 1 W, in some examples between 10 mW and 200 mW, in some examples between 20 mW and 150 mW, in some examples between 50 mW and 100 mW, in one example between 60 mW and 90 mW and in one example between 70 mW and 80 mW. The width $\Delta P_1$ of the first range (e.g., the standard deviation of the power consumption) may for example be less than 50 mW, less than 30 mW, less than 20 mW, less than 15 mW, less than 10 mW, less than 5 mW, less than 2 mW or less than 1 mW.

Power may for example be provided to the circuitry 204 via a power supply line (e.g., a voltage source/power line), which in some examples may be part of the serial data bus. In some examples, the power consumption of the circuitry 204 may be characterized (e.g., quantified) by a supply current consumed by (e.g., provided to, drawn by or flowing through) the circuitry, for example via the power supply line (e.g., the voltage source line and/or a ground line, to which a supply current drawn via the voltage source line may, e.g., be passed on to, for example in case the circuitry 204 is coupled between the voltage source and ground lines). The average supply current consumed by the circuitry 204 during execution of the first operation may for example be between 1 mA (milliampere) and 100 mA, in some examples between 2 mA and 50 mA, in some examples between 5 mA and 40 mA, in some examples between 10 mA and 30 mA, in one example between 15 mA and 27.5 mA and in one example between 20 mA and 25 mA. A width of the first range in terms of supply current (e.g., the standard deviation of the supply current) may be less than 10 mA, less than 5 mA, less than 2 mA, less than 1 mA, less than 0.5 mA, less than 0.2 mA or less than 0.1 mA. A supply voltage of the power supply line may for example be determined by the serial data bus (e.g., a communication protocol associated therewith) and may e.g. be between 1 V and 12 V. The supply voltage may for example be a common I2C supply voltage such as 1.8V, 3.3V or 5 V.

In some examples, the circuitry 204 may be to maintain its power consumption within the first range during execution of the first operation. The circuitry 204 may for example regulate its power consumption to remain within the first range during execution of the first operation. For this, the circuitry 204 may comprise a power or current regulator in some examples, e.g., similar to power regulator 918 of FIG. 9b. Regulating the power consumption of the circuitry 204 may for example render side-channel attacks by monitoring its power consumption more challenging or even impossible.

In some examples, the circuitry 204 may be to smooth its power consumption during execution of the first operation, e.g., by reducing variations or fluctuations of its power consumption. The circuitry 204 may for example deliberately consume a higher amount of power (e.g., draw an excess supply current) than actually required for executing the first operation or a part thereof, e.g., to reduce or avoid short-term or intermittent dips in its power consumption. In some examples, the circuitry 204 may consume a power that is equal to or larger than a maximum amount of power (e.g., peak power) required for executing the first operation (i.e., if not regulated or smoothed), e.g., such that the power consumption of the circuitry 204 always remains at or above this maximum amount of power. In some examples, the circuitry 204 may consume a power that is equal to or larger than a maximum amount of power required for executing any operation that can be executed by the circuitry 204, e.g., to obfuscate different current requirements of different operations or commands. An example of this is given below with reference to FIG. 11.

Additionally or alternatively, the circuitry 204 may be to jam its power consumption during execution of the first operation. As used herein, jamming a power consumption during execution of an operation may for example refer to measures that alter or modify an intrinsic (or unregulated) power consumption associated with the execution of the operation (e.g., the minimum power required for executing the respective operation by design of the circuitry 204), for example to reduce an amount of information on the execution of the operation (e.g., cryptographically sensitive or relevant parts thereof such as keys) that may be obtained by monitoring the power consumption. Jamming the power consumption may for example comprise adding noise, e.g., random noise, to the power consumption (e.g., the supply current), for example by drawing a fluctuating (e.g., randomly fluctuating) excess supply current in addition to an intrinsic (or unregulated) supply current. In any event, the circuitry 204 may be arranged to regulate power and/or current consumption so as to be within the first, high, range or the second, low, range in the low-power state discussed below, whereby jamming, smoothing or other methods may be used.

In block 406, a second command is received by the circuitry 204 from the host apparatus (e.g., the print apparatus 102, 300). The second command may be received via the same serial data bus as the first command in block 402. In this example, the second command specifies a dwell time (i.e., a time period). In some examples, the second command may request the circuitry 204 to perform one or more actions during a duration based on the dwell time (e.g., at one or more points in time during the duration, for example at a beginning and an end of the duration or during the entire duration). For example, the circuitry 204 is configured so that, upon receiving the second command, the circuitry 204 modifies a voltage condition on the serial data bus such as to generate a non-default (e.g., low) voltage condition on a line of the serial data bus and/or to release the non-default voltage condition to allow the line of the serial data bus to return to a default voltage condition (from the non-default voltage condition), e.g., as detailed below with reference to FIGS. 8 and 10. The second command may for example be used to check whether the circuitry 204 provides certain timing capabilities such as being capable of observing (e.g., meeting or complying with) certain time periods or limits, e.g., to generate the default voltage condition for a duration based on the dwell time, in some examples independent of (e.g., in absence of) a clock signal on the serial data bus.

In response to the second command, the circuitry 204 transitions to a low-power state, whereby it consumes a low power for a duration (which may also be referred to as the 'first duration' in the following) that is based on the command-specified dwell time. In the low-power state, the controller consumes power within a second range that is below and spaced apart from the first range, for example, the average power of the second range can be significantly lower than the average power of the first range. In other words, the first and second ranges do not overlap, whereby a lower limit (e.g., valley power) of the first range is greater than an upper limit (e.g., peak power) of the second range. This may for example allow for determining whether the circuitry 204 is in the low-power state based on the power consumption, e.g., to confirm whether the circuitry 204 supports or observes the low-power state.

As used herein, a duration based on a specified time (e.g., a dwell time or time period) may for example refer to a duration that depends on the specified time, e.g., increases with increasing specified time and decreases with decreasing specified time. In some examples, the duration may scale linearly with (e.g., be proportional to) the specified time. The duration may in particular be equal to the specified time or equal to the specified time up to an offset (e.g., a constant time delay, for example a settling time, or a circuitry-dependent processing time). In any event, circuitry dependent time tolerances can be expected.

The circuitry 204 may remain in the low-power state throughout the first duration (i.e., may not wake up from or exit the low-power state within the first duration). In other examples, the circuitry 204 may also wake-up from the low-power state at one or more points in time during the first duration, e.g., temporarily or intermittently, before returning to the low-power state again, for example to perform certain actions.

An example for a power consumption of the circuitry 204 in the low-power state is schematically illustrated in FIG. 5 as solid line 504. The second command may for example be received by the circuitry 204 at a second time $t_2$. An average power consumption of the circuitry 204 in the low-power state is denoted as $P_2$. A width of the second range, which is illustrated by the dashed lines below and above line 504 and may be defined as described above for the width of the first range, is denoted as $\Delta P_2$.

In some examples, the power consumption of the circuitry 204 in the low-power state may be significantly less than its power consumption during execution of the first operation. For example, the circuitry 204 may be to consume power (e.g., maintain the power consumption) during in the low-power state so that the average power consumption $P_2$ of the circuitry 204 in the low-power monitoring state may be less than 50%, less than 30%, less than 20%, less than 15%, less than 10%, less than 5%, less than 2% or less than 1% of the average power consumption $P_1$. The average supply current consumed by the circuitry 204 in the low-power state may for example be between 0 mA and 20 mA, in some examples between 0 mA and 10 mA, in some examples between 0 mA and 5 mA, in some examples between 0 mA and 2 mA, in some examples between 0 mA and 1 mA, in one example between 0.2 mA and 0.6 mA and in one example between 0.3 mA and 0.5 mA. Additionally or alternatively, the circuitry 204 may be to consume power (e.g., maintain the power consumption) in the low-power state so that an upper limit (e.g., a maximum peak power) of the second range may be less than 50%, less than 30%, less than 20%, less than 10%, less than 5% or less than 2% of a lower limit (e.g., a minimum valley power) of the first range. The width of the second range $\Delta P_2$ may be equal to or less than the width of the first range $\Delta P_1$, e.g., less than 75%, less than 50% or less than 25% of $\Delta P_1$.

In one example, the average power consumption $P_1$ of the circuitry 204 during execution of the first operation is between 50 mW and 100 mW (which may, e.g., correspond to an average supply current between 10 mA and 40 mA) and the average power consumption $P_2$ of the circuitry 204 in the low-power mode is between 0 mW and 5 mW (which may, e.g., correspond to an average supply current between 0 mA and 2 mA). Additionally or alternatively, the width $\Delta P_1$ of the first range and the width $\Delta P_2$ of the second range may for example be less than 10 mW (which may, e.g., correspond to a width of a supply current range of less than 5 mA, in one example less than 3 mA). In another example, the average power consumption $P_1$ of the circuitry 204 during execution of the first operation is between 70 mW and 80 mW (which may, e.g., correspond to an average supply current between 20 mA and 25 mA) and the average power consumption $P_2$ of the circuitry 204 in the low-power mode is between 0.1 mW and 2 mW (which may, e.g., correspond to an average supply current between 0 mA and 0.6 mA). Additionally or alternatively, the width $\Delta P_1$ of the first range may for example be less than 5 mW (which may, e.g., correspond to a width of a supply current range of less than 2 mA, in one example less than 1 mA) and the width $\Delta P_2$ of the second range may be less than 2 mW, in one example less than 1 mW (which may, e.g., correspond to a width of a supply current range of less than 0.6 mA, in one example less than 0.3 mA).

In some examples, the low-power state may be a low-power state that is associated with one or more particular operations, e.g., specifically adapted for execution of the one or more operations in the low-power state. The low-power state may for example support execution of the one or more operations but not support execution of other operations. This may for example allow for de-activating, switching off or putting to sleep (or standby) certain parts or components of circuitry 204 that are not used for the one or more operations to reduce power consumption. In some examples, the circuitry 204 may also provide a standby state in addition to the low-power state, wherein the standby state may for example differ from the low-power state in the operations whose execution is supported by the respective state (e.g., the standby state may not be associated with or support execution of any operations or with/of less operations than the low-power state). Additionally or alternatively, the standby state may for example differ from the low-power state in an exit condition for exiting the respective state and/or in a power consumption of supply current of the circuitry in the respective state, e.g., as detailed below.

In some examples, the low-power state may be associated with a timer. The timer is present in the circuitry 204. The timer may have a frequency that is independent of a clock frequency on the serial data bus (e.g., a frequency of a clock signal provided by the host apparatus). The timer may have a frequency that is higher than the clock frequency on the serial data bus. The controller may be configured to run the timer during the low-power state, for example at least until expiry of the duration based on the dwell time.

In some examples, the low-power state may be a low-power monitoring state for monitoring for expiry of a duration, in particular the first duration (which is based on the dwell time). Put differently, the low-power state may support execution of a monitoring operation (e.g., a time-keeping operation) to monitor for expiry of the first duration. In some examples, the (first) duration as monitored in the low-power monitoring state may differ slightly from the (first) duration for which the circuitry 204 consumes power within the second range in the low-power state, e.g., due to circuitry-specific processing times, time offsets and/or set-tling times involved. The circuitry 204 may for example monitor for expiry of the first duration using a timer (e.g., as described above) such as a resistance-capacitor (RC) circuit, a crystal or ring oscillator, a phase lock loop, or a counter (e.g., implemented using logic gates). Additionally or alternatively, the circuitry 204 may for example monitor for expiry of the first duration using a delay circuit such as a delay line switch, wherein the delay circuit may for example be to expire upon expiry of the first duration. The circuitry 204 may comprise the timer and/or the delay circuit.

In some examples, the circuitry 204 may be to generate a voltage condition, in particular a non-default voltage condition (e.g., a low voltage condition), on the serial data bus (e.g., on a line of the serial data bus) in the low-power state (e.g., in the low-power monitoring state), for example as detailed below with reference to FIGS. 8 and 10. The circuitry 204 may for example be to maintain a non-default voltage condition while in the low-power state (e.g., as part of or after block 408), wherein the non-default voltage condition may, e.g., have been applied or generated initially by the circuitry 204 before transitioning to the low-power state. Additionally or alternatively, the circuitry may also be to modify a voltage condition on the line of the serial data bus while in the low-power state, e.g. to apply or release the non-default voltage condition, for example to temporarily or intermittently generate the non-default voltage condition.

In addition to or instead of generating a non-default (e.g., low) voltage condition on a line of the serial data bus (e.g., by generating the non-default voltage condition on a serial data bus interface of the circuitry 204 connected to the line of the serial data bus, for example a data interface or contact), the circuitry 204 may be to generate a voltage condition on a contact (e.g., a contact pad or pin) of the circuitry 204 in the low-power state, for example to drive the contact to a particular voltage (e.g. a low voltage or a high voltage), which may, e.g., be specified by the second command. The contact may not be connected to the serial data bus and may, e.g., be a general-purpose input output (GPIO) contact of the circuitry 204. As far as technically feasible, all examples given herein relating to the generation of a (non-default) voltage condition of the serial data bus may thus equally apply to the generation of a voltage condition on a contact of the circuitry 204.

In some examples, the circuitry 204 comprises serial bus interfaces including data, clock, power, and/or ground. The circuitry 204 may be configured to generate a non-default (e.g., low) voltage condition on the data interface in response to the second command for a duration based on the dwell time of the second command (which may also be referred to as the second duration in the following and which may be equal to or different from, e.g., larger than, the first duration). The circuitry 204 may be configured to generate a low-power state (e.g., a low-current state such as a low supply current state) on an interface other than the data interface, in response to the second command for the first duration (e.g., on the power interface, the ground interface and/or the clock interface of the serial bus interfaces and/or on a separate power supply interface, which may, e.g., be connected to a power supply such as a voltage source, which in some examples may be a battery).

The circuitry 204 may be to generate the non-default (e.g., low) voltage condition on the line of the serial data bus in response to the second command (which may, e.g., be a request from the host apparatus to generate the non-default voltage condition such as a 'set voltage command' as described below with reference to FIG. 10). The circuitry 204 may be to generate the non-default voltage condition during one or more points in time (e.g., such that the line is at the non-default voltage condition at least at said points in time, in some examples continuously throughout the entire duration spanned by said points in time). In some examples, said points in time may be sampling points at which a sampling of a voltage on the line of the serial data bus, e.g., by the host apparatus, is to be expected. In some examples, the circuitry 204 may be to generate the non-default voltage condition on the line of the serial data bus during a first point in time and during a second point in time, the first and second points in time being separated by a duration (which may also be referred to as the third duration in the following) based on the dwell time. The third duration may be equal to or shorter than the second duration, e.g., by a settling time and/or a fixed time offset. In one example, the circuitry 204 is to apply the non-default voltage condition at or before the first point in time, maintain the non-default voltage condition between the first and second points in time (e.g., continuously) and allow the line to return its default voltage condition (i.e., release the non-default voltage condition) at or after the second point in time. In other examples, the circuitry 204 may generate or release the non-default voltage condition temporarily or intermittently and may for example generate the non-default voltage condition for a short period around the first point in time and for a short period around the second point in time while allowing the bus (e.g., the respective line of the bus) to return to its default voltage condition between the first and second points in time.

The circuitry 204, in response to the second command, may be to generate the low-power state on a line of the serial data bus (e.g., a voltage source/power line and/or a ground line). If the circuitry 204 also is to generate a non-default voltage condition on a line of the serial data bus as described above, the line on which the low-power state is generated may be different from the line on which the non-default voltage condition is generated. The circuitry 204 may be to generate the low-power state on the line of the serial data bus during a third point in time (which may correspond to the first point in time mentioned above) and during a fourth point in time (which may correspond to the second point in time mentioned above), the third and fourth points in time being separated by a duration based on the dwell time (which may also be referred to as the fourth duration in the following). The fourth duration may be equal to or shorter than the first duration, e.g., by a settling time and/or a fixed time offset.

In addition to or instead of the blocks 402-408 and/or the actions described above, the method 400 may comprise other blocks and/or actions associated with other methods according to the examples described herein, in particular some or all of blocks 602-608 of method 600, blocks 702-708 of method 700 and blocks 1002-1012 of method 1000 described below. Put differently, the circuitry 204 (e.g., secure controller) executing method 400 may additionally or alternatively also be to execute some or all of the respective blocks or actions.

Figure 6:
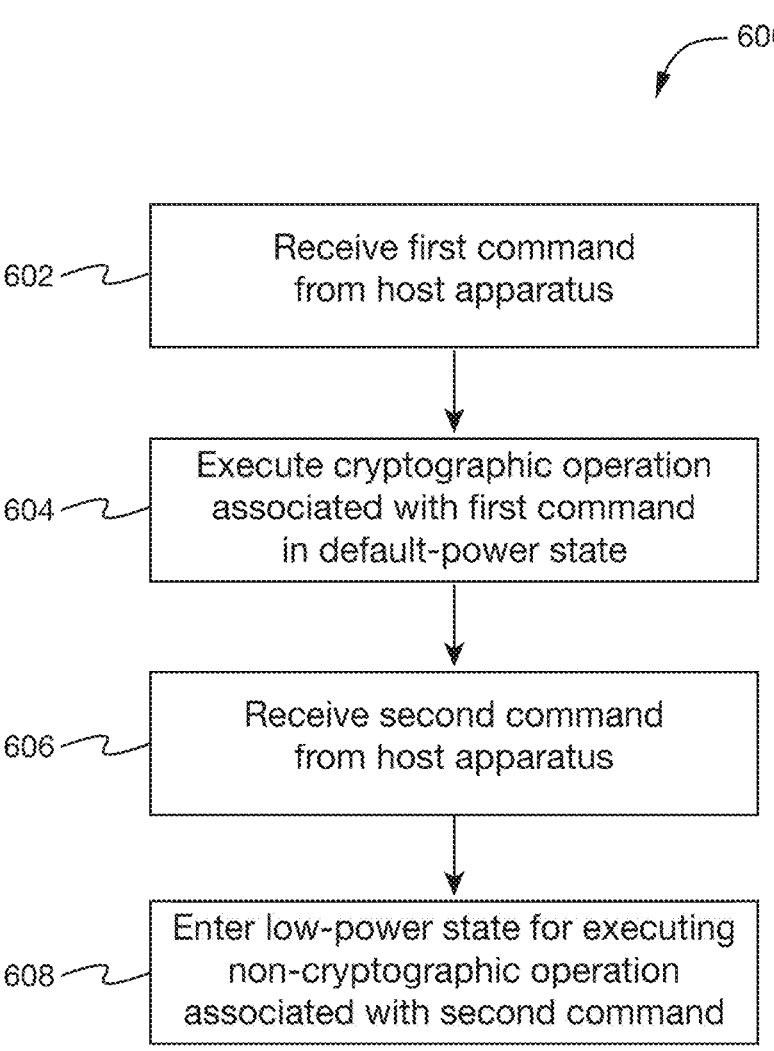
FIG. 6: a method of operating circuitry for association with a replaceable print apparatus component according to an example.

FIG. 6 depicts a flow chart of a method 600 in accordance with another example. The method 600 may for example be executed by circuitry for association with a replaceable print apparatus component according to any of the examples described herein, e.g., the circuitry 204 of FIG. 2, which is used as a non-limiting example for illustration purposes in the following. The circuitry executing method 600 may comprise a serial data bus interface that is to interface with a serial data bus of a host apparatus (e.g., with the communications link 306 of the printing apparatus 300 of FIG. 3). In some examples, the circuitry executing the method 200 may be secure circuitry (e.g., a secure controller) for a replaceable print apparatus component, wherein the secure circuitry may be to perform secure communication with a host apparatus via the serial data bus. The method 600 is not limited to the order of execution indicated by the flow chart in FIG. 6. As far as technically feasible, the method 600 may be executed in an arbitrary order and steps thereof may also be executed simultaneously at least in part.

In block 602, a first command is received by the circuitry 204 from the host apparatus via the serial data bus, e.g., similar to block 402 of method 400. The first command is associated with a cryptographic operation, e.g., as described above for method 400.

In response to the first command received from the host apparatus via the serial data bus, the circuitry 204 executes the cryptographic operation in block 604. The cryptographic operation is executed in a default-power state of circuitry 204. The default-power state may be associated with a normal (or default) mode of operation of the circuitry 204 and may for example be employed for execution of (e.g., all) cryptographic operations or in response to (e.g., all) commands associated with a cryptographic operation (i.e., cryptographic challenges). In some examples, the default-power state may be employed in response to all commands except for a select subset of one or more commands (including, e.g., at least the second command described below).

The supply current of the circuitry 204 in the default-power state may be within a predefined first current band. The predefined first current band may for example be centered around a predefined average supply current and may have a predefined width around the average supply current. The average supply current and the width of the current band may for example be within the ranges given above for method 400. In some examples, the predefined first current band may correspond to the first range of power consumption described above for method 400. Put differently, the circuitry 204 may be to consume power (e.g., maintain the power consumption) within the first range as described above when in the default-power state.

Figure 9A:
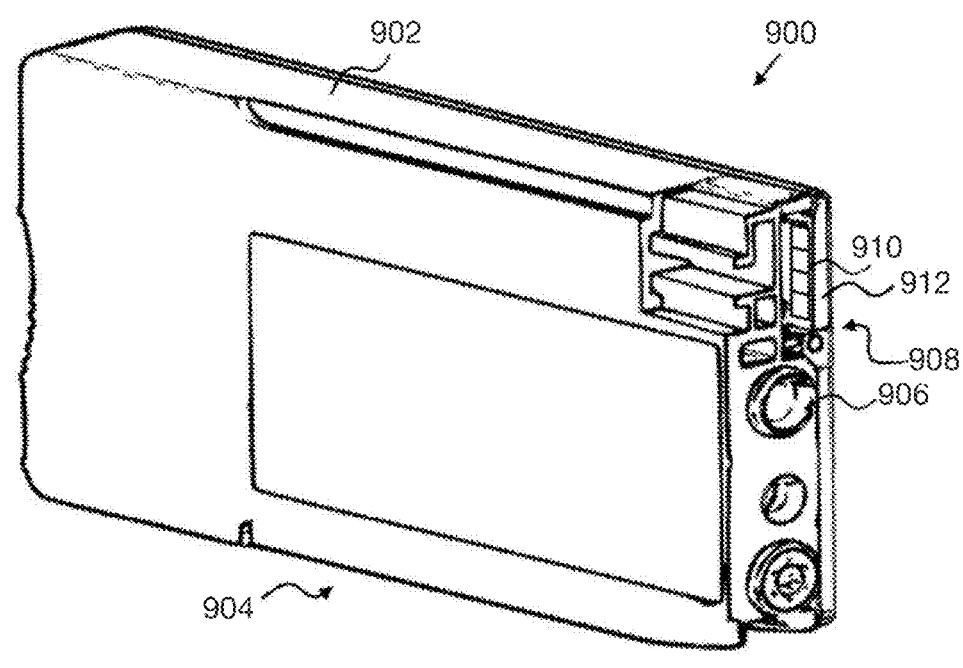
FIG. 9*a*: a replaceable print apparatus component according to another example.
Figure 9B:
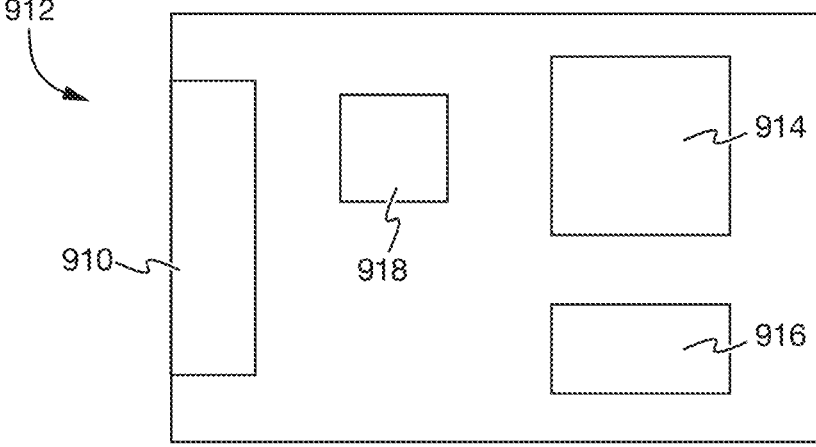
FIG. 9*b*: circuitry associated with the replaceable print apparatus component of FIG. 9*a* according to an example.

In some examples, the circuitry 204 comprises a current regulator, e.g., as shown in FIG. 9b for circuitry 912. The current regulator may be to maintain the supply current of the circuitry 204 to be within the predefined first current band in the default-power state. The current regulator may for example draw a constant supply current, e.g., via a power supply line of the serial data bus, that is independent of an intrinsic (or unregulated) power consumption of the circuitry 204 for executing the cryptographic operation. The current regulator may provide a supply current for meeting the intrinsic power consumption to other parts or components of the circuitry 204 while disposing of (e.g., redirecting or shunting) any excess supply current. The current regulator may be to smooth and/or jam the supply current of the circuitry 204, e.g., as described above for method 400.

In block 606, a second command is received by the circuitry 204 from the host apparatus via the serial data bus, e.g., similar to block 406 of method 400. The second command is associated with a non-cryptographic operation. The non-cryptographic operation may for example not involve the use of secret keys, in some examples of any cryptographic keys or in some examples of any cryptographically sensitive information (e.g., information that might be exploited by an attacker for compromising the secure communication). For example, the requested operation itself does not involve computing session keys or MACs or other cryptographic components.

In response to the second command received from the host apparatus via the serial data bus, the circuitry 204 enters a low-power state associated with the non-cryptographic operation for executing the non-cryptographic operation in block 608. The low-power state may be adapted for execution of the particular non-cryptographic operation and may for example support execution of this non-cryptographic operation (or a select subset of operations, in particular non-cryptographic operations) but may not support execution of other operations, in particular cryptographic operations. This may allow the circuitry 204 to operate with reduced supply current as compared to the default-power state, e.g., by de-activating, switching off or putting to sleep (or standby) some or all parts or components of circuitry 204 that are not used for the non-cryptographic operation or select subset of operations. A supply current of the circuitry 204 in the default-power state may thus be higher than in the low-power state. In some examples, the low-power state associated with the non-cryptographic operation may be similar to (or the same as) the low-power state of block 408 described above, e.g., in terms of the supply current or power consumed by the circuitry 204.

For example, the non-cryptographic operation involves pulling a voltage on the data contact (e.g., the data line of the serial bus via the data contact) low for a (e.g., first) duration based on the specified dwell time or time period. The circuitry 204 may be configured to pull the voltage on the data line low, for the duration of the time period, while consuming low power, in the low-power state (e.g., consuming power within the second range). Hence, the proactive control of the data line voltage, and control of the duration based on the time period, are executed in a low power state.

The supply current of the circuitry 204 in the low-power state may be within a predefined second current band. The predefined second current band may for example be centered around a predefined average supply current and may have a predefined width around the average supply current. The average supply current and the width of the second current band may for example be within the ranges given above for the low-power state of method 400. In some examples, the predefined second current band may correspond to the second range of power consumption described above for method 400. Put differently, the circuitry 204 may be to consume power (e.g., maintain the power consumption) within the second range as described above when in the low-power state. In some examples, the circuitry 204 comprises a current regulator and the current regulator may be to maintain the supply current of the circuitry 204 to be within the predefined second current band in the low-power state, e.g., as described above for the default-power state.

In some examples, the second command specifies a time period (e.g., a dwell time). The circuitry 204 may be to exit the low-power state upon expiry of a duration based on the time period. For example, the non-cryptographic operation may be or comprise running a timer and/or a monitoring operation for monitoring for expiry of the duration, for example as described above for method 400. In some examples, the monitoring is executed with a timer or delay circuit. When exiting the low-power state, the circuitry 204 may enter the default-power state in some examples, e.g., to execute a cryptographic task such as generating an authenticated response for the host apparatus.

Block 608 may comprise executing the non-cryptographic operation, wherein the circuitry 204 may remain in the low-power state throughout execution of the non-cryptographic operation or at least a part thereof (i.e., may for example exit or wake-up from the low-power state temporarily or intermittently).

In some examples, executing the non-cryptographic operation comprises generating a non-default voltage condition on the serial data bus, for example as described above for method 400 of FIG. 4 or below for method 1000 of FIG. 10. Generating the non-default voltage condition may for example comprise applying the non-default voltage condition and/or maintaining a non-default voltage condition applied previously, e.g., prior to entering the low-power state.

The circuitry 204 may further be to enter a standby state upon completion of execution of an operation, e.g., after executing the cryptographic operation in block 604 and/or after executing the non-cryptographic operation in block 608. The standby state is different from the low-power state associated with the non-cryptographic operation. For example, the standby state may not be associated with any particular operation but may, e.g., be to simply wait for receiving another command. In one example, the circuitry 204 may not generate a non-default voltage condition on the serial data bus in the standby state.

Additionally or alternatively, the standby state may differ from the low-power state in at least one of an exit condition for exiting the respective state and a supply current of the circuitry in the respective state. For example, the standby state may have a first exit condition (e.g., receipt of another command) and the low-power state may have a second exit condition different from the first exit condition (e.g., expiry of a duration). In some examples, the low-power state may additionally have the first exit condition. The standby state may differ from the low-power state in the supply current of the circuitry 204 for example as a result of the circuitry executing the non-cryptographic operation in the low-power state, e.g., monitoring for expiry of a duration and/or generating a non-default voltage condition on the serial data bus.

In some examples, the circuitry 204 may perform one or more actions or tasks in response to the second command prior to entering the low-power state in block 408, e.g., in the default-power state. The one or more actions may for example be associated with receiving the second command in block 406 and may involve one or more cryptographic actions or tasks. For example, the second command may be authenticated by the host apparatus (e.g., associated with a message authentication code (e.g., uniquely) authenticating the host apparatus) and the circuitry, in response to the second command, may confirm authentication of the second command (e.g., to determine the authenticity of the host apparatus) in the default-power state prior to entering the low-power state for executing the non-cryptographic operation. The supply current of the circuitry 204 may thus exhibit an intermittent increase or peak in response to the second command before entering the low-power state, e.g., as detailed below with reference to FIG. 11.

In some examples, the host apparatus is to sample a supply current on the serial data bus (e.g., on a line thereof such as a voltage source line and/or a ground line) at one or more sampling points during execution of method 400, for example as described below for method 1000 of FIG. 10. The circuitry may be configured to be in a power state expected by the host apparatus (e.g., based on a respective command sent by the host apparatus) at an expected sampling time at which the host apparatus is expected to sample the supply current. The host apparatus may for example sample the supply current on the serial data bus after issuing the first command and the circuitry may be in the default-power state at least at an expected sampling time at which the host apparatus is expected to sample the supply current after issuing the first command. Additionally or alternatively, the host apparatus may sample the supply current on the serial data bus after issuing the second command and the circuitry may be in the low-power state at least at an expected sampling time at which the host apparatus is expected to sample the supply current after issuing the second command.

In addition or instead of the blocks 602-608 and/or the actions described above, the method 600 may comprise other blocks and/or actions associated with other methods according to the examples described herein, in particular some or all of blocks 402-408 of method 400, blocks 702-708 of method 700 and blocks 1002-1012 of method 1000 described herein. Put differently, the circuitry 204 (e.g., secure controller) executing method 600 may additionally or alternatively also be to execute some or all of the respective blocks or actions.

Figure 7:
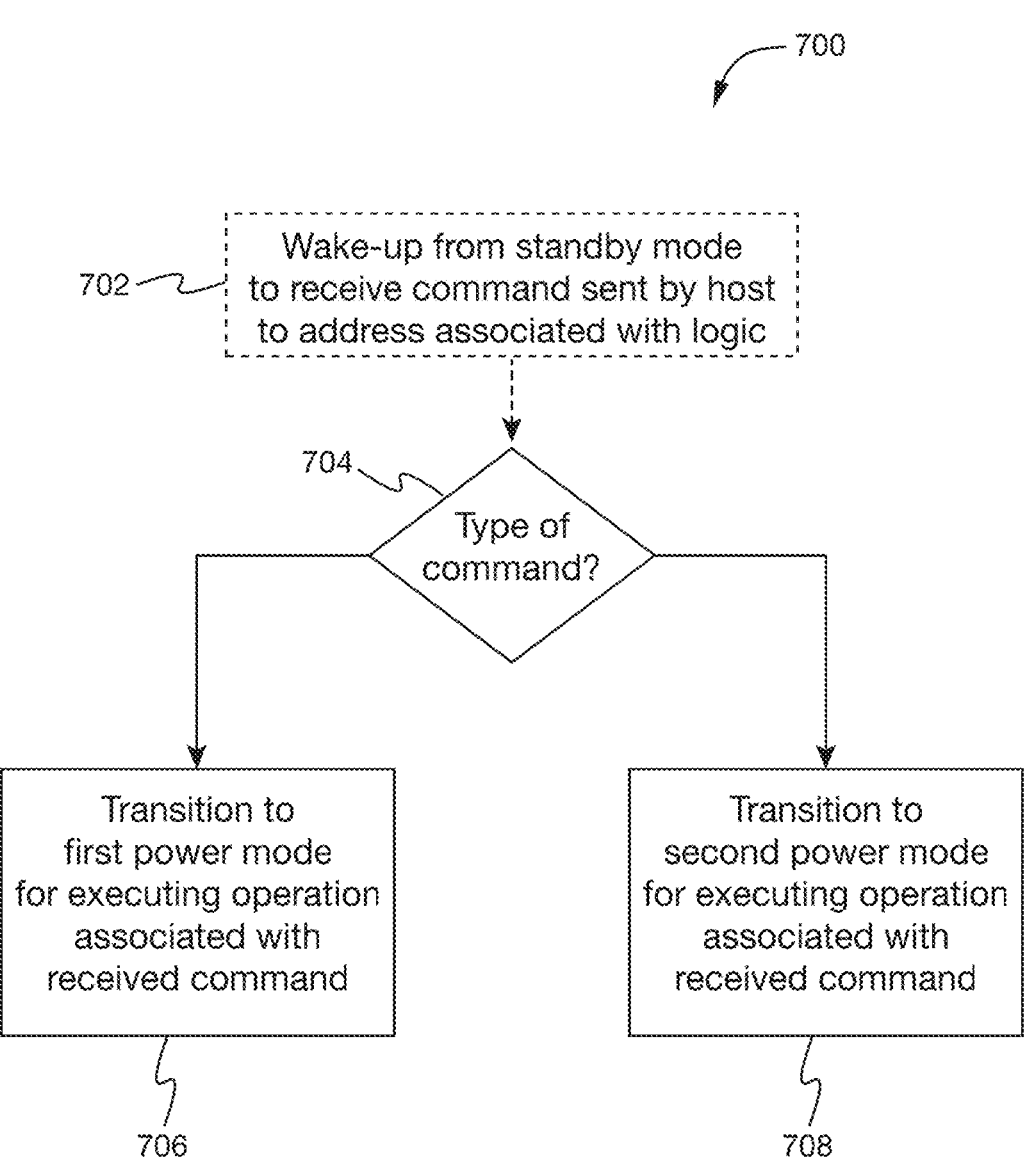
FIG. 7: a method of operating a replaceable print apparatus component according to an example.

FIG. 7 depicts a flow chart of a method 700 in accordance with another example. The method 700 may for example be executed by circuitry (e.g., logic) for association with a replaceable print apparatus component according to any of the examples described herein, e.g., the circuitry 204 of FIG. 2. The circuitry 204 may be associated with (e.g., comprised in) a replaceable print apparatus component comprising a serial bus interface to communicate with a host over a serial bus, for example the replaceable print apparatus component 200 of FIG. 2 with the communications interface 202 for communication with a print apparatus such as the print apparatus 300. The replaceable print apparatus component 200 and the circuitry 204 of FIG. 2 are used as a non-limiting example for illustration purposes in the following. In some examples, the circuitry executing the method 700 may be secure circuitry (e.g., a secure controller) for a replaceable print apparatus component, e.g., as described above for method 400. The method 700 is not limited to the order of execution indicated by the flow chart in FIG. 7. As far as technically feasible, the method 700 may be executed in an arbitrary order and steps thereof may also be executed simultaneously at least in part.

In some examples, the circuitry 204 (e.g., the entire replaceable print apparatus component 200) may be in a standby mode prior to execution of method 700. The circuitry 204 may be associated with a particular address (e.g., a serial bus address such as an I2C address). In response to a command sent by the host over the serial bus to the address associated with the circuitry 204, the circuitry 204 may wake-up from the standby mode to receive the command in block 702. Receipt of a command sent to the address associated with the circuitry 204 may for example be defined as an exit condition of the standby mode. Block 702 may comprise determining an address that the command is sent to, e.g., to determine whether or not the command is addressed at the circuitry 204. If the command is not addressed at the circuitry 204, the circuitry 204 may return to or remain in standby mode. Otherwise, method 700 may proceed to block 704.

In some examples, the circuitry 204 may determine a type of the command sent to the address associated with the circuitry 204 in block 704. This may for example comprise determining whether the command corresponds to a certain command or subset of commands (e.g., is a command specifying a dwell time or time period or is a command associated with a non-cryptographic operation, e.g., a command requesting generation of a non-default voltage condition). In some examples, the circuitry 204 may use a look-up table or the like to make this determination. For example, each command may comprise a command identifier (e.g., a byte identifying the command or the type of the command) and the look-up table may comprise a list of command identifiers, e.g., associating each command identifier with a type of command and/or a corresponding power mode (or state) that the circuitry 204 is to transition to.

Depending on the type of command, the circuitry selectively transitions to either a first power mode (block 706) or a second power mode (block 708) for executing an operation associated with the received command. For example, if the received command specifies a dwell time, the circuitry 204 may transition to the second power mode in block 708, e.g., as described above for method 400. If the received command does not specify a dwell time, the circuitry 204 may instead transition to the first power mode in block 706. Additionally or alternatively, if the received command is associated with a cryptographic operation, the circuitry 204 may transition to the first power mode in block 706, whereas if received command is associated with a non-cryptographic operation (e.g., a monitoring operation or a generation of a non-default voltage condition), the circuitry 204 may instead transition to the second power mode in block 708, e.g., as described above for method 600.

The first and second power modes differ from each other in a supply current drawn by the logic over the serial bus in the respective power mode. For example, the supply current in the second power mode may be lower than in the first power mode. In some examples, the first power mode may be a default-power state and the second power mode may be a low-power state, e.g., as described above for methods 400 and 600.

In some examples, the circuitry 204 may draw a supply current in a first current range over the serial bus in the first power mode. Additionally or alternatively, the circuitry 204 may draw a supply current in a reduced-current range over the serial bus in the second power mode. The reduced-current range may be less than, and distanced from, the first current range. A center of the reduced-current range (which may, e.g., correspond to an average supply current of the circuitry 204 in the second power mode) may be less than 50%, less than 30%, less than 20%, less than 15%, less than 10%, less than 5%, less than 2% or less than 1% of a center of the first current range (which may, e.g., correspond to an average supply current of the circuitry 204 in the first power mode). In some examples, the first current range and/or the second current range may correspond to the first and second range, respectively, of the power consumption of the circuitry 204 described above for method 400.

In some examples, the logic may be to draw the supply current (e.g., in the first current range and the reduced-current range, respectively) in the first power mode and/or in the second power mode for a duration based on a time period (or dwell time) specified in the respective command sent to the address associated with the logic. Put differently, the logic may remain in (or maintain) the first power mode and/or the second power mode for a duration based on a time period specified in the respective command.

In some examples, the circuitry 204 may further provide one or more additional power modes, e.g., a third power mode, for example as detailed below for method 1000. Depending on the type of command sent to the address associated with the circuitry 204, the circuitry 204 may transition to either the first power mode (block 706), the second power mode (block 708) or the third power mode. The third power mode may differ from both the first and second power modes in a supply current drawn by the circuitry 204 over the serial bus in the respective power mode. For example, the circuitry 204 may draw a supply current in a broadened current range over the serial bus in the third power mode. The broadened current range may be broader than the first current range and the reduced-current range. The broadened current range may extend at least between the first current range and the reduced-current range (e.g., between an upper limit of the second current range and a lower limit of the first current range). In some examples, the broadened current range may overlap with (e.g., include) at least a part of the first and/or second current range.

The third power mode may for example be an unregulated power mode in which the supply current drawn by the logic over the serial bus is unregulated. For example, the circuitry 204 may allow its supply current (or power consumption) to fluctuate freely, e.g., as described below with reference to FIG. 11. The broadened current range may for example be a fluctuation range of the unregulated supply current. The circuitry 204 may not smooth or jam its supply current in the third power mode. In some examples, the circuitry 204 may not (actively) maintain its supply current within any particular range. The supply current in the third power mode may for example correspond to an intrinsic supply current associated with execution of an operation by the circuitry 204.

In contrast, one or both of the first and second power modes may be regulated power modes in which the supply current drawn by the logic over the serial bus is regulated. For example, the circuitry 204 may maintain its supply current within the respective ranges in the first and/or second power modes, e.g., by smoothing and/or jamming its supply current, for example as described above for method 400.

In addition or instead of the blocks 702-708 and/or the actions described above, the method 700 may comprise other blocks and/or actions associated with other methods according to the examples described herein, in particular some or all of blocks 402-408 of method 400, blocks 602-608 of method 600 and blocks 1002-1012 of method 1000 described herein. Put differently, the circuitry 204 (e.g., logic or secure controller) executing method 700 may additionally or alternatively also be to execute some or all of the respective blocks or actions.

Figure 8:
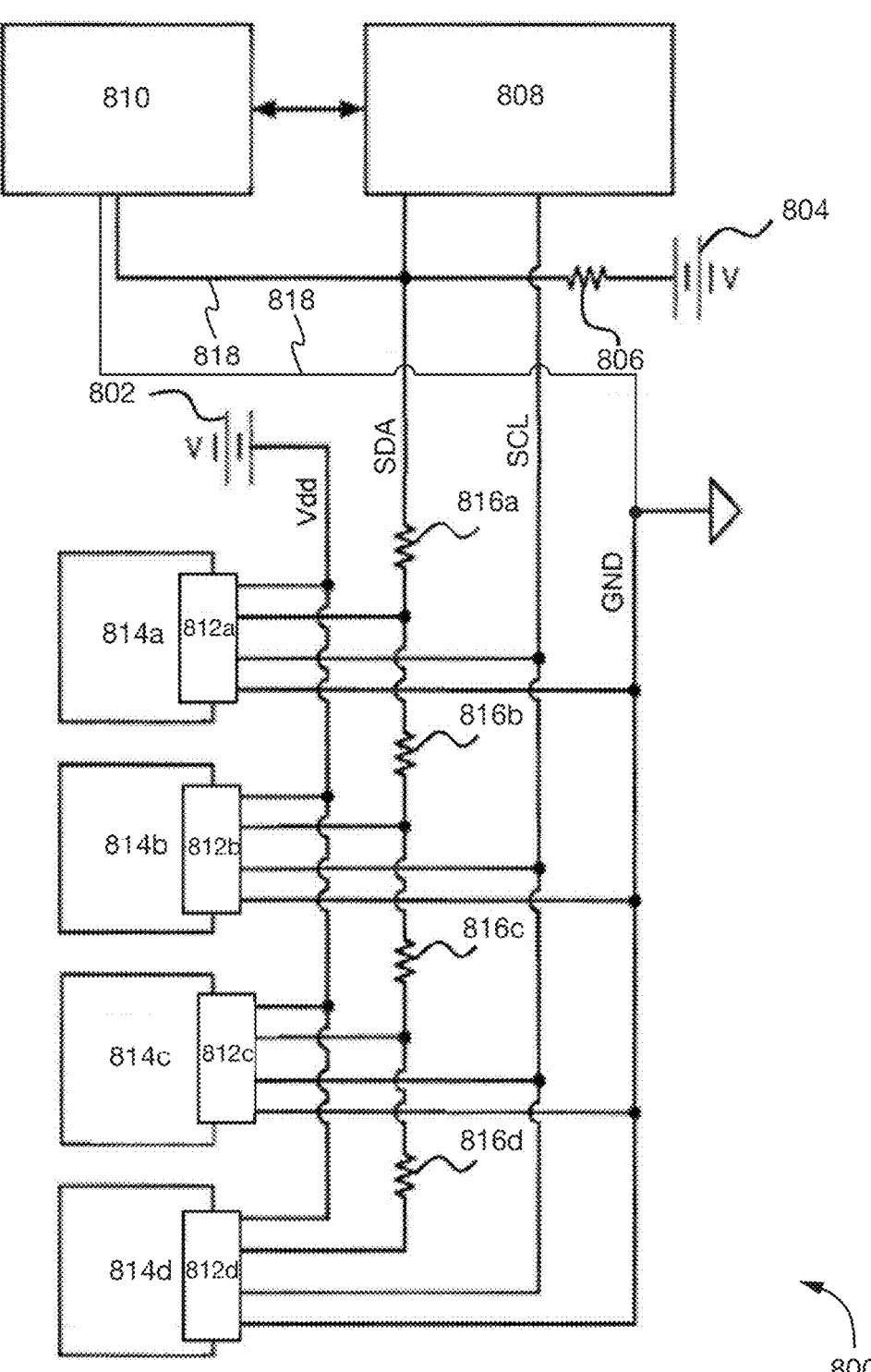
FIG. 8: an electronic block diagram of a serial data bus of a host apparatus according to an example.

FIG. 8 shows a schematic illustration of an electronic block diagram of a serial data bus 800 in accordance with an example. The serial data bus 800 may for example be provided as part of a host apparatus, e.g., a printing system such as the printing system 100 or a print apparatus such as the print apparatus 102, 300. For example, the serial data bus 800 may be provided as the communications link 106 or the communications link 306. In some examples, the serial data bus 800 may be an I2C serial data bus, e.g., be compatible with or support communications via an I2C protocol. The serial data bus 800 may thus also be referred to as 'I2C bus 800' in the following.

The I2C bus 800 comprises a plurality of lines (or wires) such as one or more communication lines (e.g. a data line or serial data line SDA and a clock line or serial clock line SCL in the example of FIG. 8) and one or more power supply lines (e.g. a voltage source line or connection Vdd and a ground line or connection GND in the example of FIG. 8). The voltage source line Vdd may be connected to a first voltage source 802, which may, e.g., be to provide a first reference or supply voltage via the voltage source line Vdd. The ground line GND may be connected to a voltage reference that is to supply a second reference voltage, e.g., to ground. The supply voltage provided by the first voltage source 802 (e.g., relative to the ground line GND) may for example be between 1 V and 12 V, e.g. 1.8 V, 3.3 V or 5 V. The first voltage source may function as a power supply or current supply for devices, e.g., secondary devices, connected to the I2C bus 800.

The data line SDA may be connected to a second voltage source 804, for example via a resistor 806, which may also be referred to as pull-up resistor 806. The second voltage source 804 may be to generate a default voltage condition on the data line, which may also be referred to as a high-voltage condition. In the default voltage condition, a voltage on the data line SDA (also referred to as 'HIGH voltage') may for example be larger than a threshold voltage value associated with a logic "1". The threshold voltage may for example be between 1 V and 2 V. The HIGH voltage may for example be between 3 V and 10 V, e.g., 3.3 V or 5 V. The pull-up resistor may be dimensioned such that when the data line SDA is pulled low (e.g., grounded or connected to the ground line GND) by one of the devices connected to the I2C bus 800, a voltage on the data line SDA (also referred to as 'LOW voltage') is smaller than a threshold voltage value associated with a logic "0" (which may be equal to or smaller than the threshold voltage associated with a logic "1"). A resistance of the pull-up resistor may for example be between 100 Ohm and 10 kOhm, in some examples between 500 Ohm and 2 kOhm, for example 1 kOhm (1000 Ohm). In this way, data (e.g., messages such as commands) may be communicated via the I2C bus.

Data communication via the I2C bus may be synchronized with a clock signal provided on the clock line SCL, wherein the clock signal may, e.g., indicate when data bits are to be transmitted to or read-out from the data line SDA. For example, the voltage on the data line SDA or a slope thereof (e.g., a rising or falling voltage) during a particular clock period (e.g., when the voltage on the clock line SCL is HIGH) may indicate whether the respective data bit corresponds to "0" or "1".

In the example of FIG. 8, a primary or host device 808 interfaces with (e.g., is connected to) the I2C bus 800. The primary device 808 may for example be associated with (e.g., part of) a host apparatus such as print apparatus. The primary device 808 may for example be comprised in or be the host/printer-side circuitry 304 with the interface 302 of the print apparatus 300. In some examples, the primary device 808 may provide the clock signal on the clock line SCL.

The primary device 808 may comprise a sampling device 810 for sampling (e.g., determining or measuring) a voltage or current on one or more lines of the I2C bus, e.g., on the data line SDA and/or the ground line GND, for example via a pair of probe lines 818 as in the example of FIG. 8. The sampling device 810 may for example be or comprise an analog-to-digital converter (ADC). A current on a line of the I2C bus may for example be sampled by sampling a voltage over a sampling resistor with a known resistance arranged along the respective line. In some examples, the sampling device 810 may be similar to the sampling device 1210 of FIG. 12 described below.

Also interfacing with (e.g., connected to) the I2C bus 800 are a plurality of secondary devices 812a-d, e.g., via respective serial data bus interfaces. Each of the serial data bus interfaces may for example comprise a respective contact (e.g., contact pad or pin) for each of the lines of the I2C bus 800. In the example of FIG. 8, the secondary devices 812a-d are circuitry (e.g., secure controllers) associated with a respective replaceable print apparatus component 814a-d. The secondary devices 812a-d may for example be embodied as described above for the circuitry 204. Each of the secondary devices 812a-d may be associated with a unique address, which may allow for selectively communicating with a particular one of the secondary devices 812a-d. The secondary devices 812a-d may be supplied with power by the first voltage source 802 via the voltage source line Vdd. For example, each of the secondary devices 812a-d may draw a respective supply current from the first voltage source 802 via the voltage source line Vdd and the ground line GND.

A plurality of resistors 816a-816d may be arranged along the data line SDA, for example a respective resistor for some or all of the secondary devices 812a-d. The resistors 816a-816d may be arranged in series to form a voltage divider network, e.g., in combination with the pull-up resistor 806. The voltage divider network may be formed such that the LOW voltages associated with the secondary devices 812a-d differ slightly from each other for some or all of the secondary devices 812a-d, i.e., such that a voltage on the data line SDA when the data line SDA is pulled low by a given secondary device 812a-d takes a slightly different value for each of the respective secondary devices 812a-d. The resistors 816a-816d may be dimensioned, e.g., in comparison with the pull-up resistor 806, such that the LOW voltages associated with the respective secondary devices 812a-d are sufficiently different to be distinguished from one another by the primary device 808 (e.g., by the sampling device 810 thereof) while all being below the threshold voltage associated with a logic "0", e.g. so as to not interfere with the communication of data.

A resistance of the resistors 816a-816d may be smaller, in some examples significantly smaller, than the resistance of the pull-up resistor 806. Each of the resistors 816a-816d may for example have a resistance between 5 mOhm and 100 mOhm, in some examples between 20 mOhm and 80 mOhm, e.g., 50 mOhm (0.05 Ohm). The LOW voltages associated with the secondary devices 812a-d may all be below 1 V, in some examples below 0.7 V, in one example below 0.5V and in one example below 0.3 V. The LOW voltages associated with the secondary devices 812a-d may for example differ from each other by at least 5 mV, in some examples at least 10 mV, in one example at least 20 mV and in one example at least 50 mV.

The differing LOW voltages of the secondary devices 812a-d may allow for determining a position of the respective secondary device 812a-d along the I2C bus, for example to check whether the respective secondary device 812a-d is at the correct position (e.g., in a correct slot for the corresponding replaceable print apparatus component). For this, the primary device 808 may for example send a command to a particular secondary device 812a-d (e.g., to the address associated therewith), requesting the respective secondary device 812a-d to generate a non-default voltage condition on the data line (i.e., a voltage condition differing from the default/high-voltage condition), for example as described in international patent application publication Nos. WO 2020/117196 and WO 2020/117297, which are incorporated herein by reference in their entirety and for all purposes. An example for this is described below with reference to FIG. 10.

FIG. 9a shows a schematic illustration of a replaceable print apparatus component 900 in accordance with an example. The replaceable print apparatus component 900 may for example be a print material cartridge (print material container) and may also be referred to as print cartridge 900 in the following. The print cartridge 900 has a housing 902, which may house a print material reservoir (not shown) containing a print material, e.g., a print liquid such as ink. A print material output 904, e.g., an outlet is provided on the underside of the cartridge 900 in this example. An air input 906 and recess 908 are provided in a front face of the cartridge 900. The recess 908 may extend across the top of the cartridge 900.

The print cartridge 900 comprises circuitry (or logic) 912 and a serial bus interface 910 (e.g., I2C bus contacts), which in some examples may be provided as part of (e.g., integrated with) the circuitry 912. The circuitry 912 may for example be embodied as described above for the circuitry 204. The circuitry 912 may be to execute any of the methods according to the examples described herein, for example the method 400, the method 600, the method 700, and/or the method 1000. The serial bus interface 910 may be provided at a side of the recess 908 against the inner wall of the sidewall of the housing 902 adjacent the top and front of the housing 902. In this example, the circuitry 912 is provided against the inner side of the sidewall.

FIG. 9b shows a schematic illustration of the circuitry 912 according to an example. In some examples, the circuitry 912 may be provided as a secure controller such as a secure microcontroller or a smartcard. The circuitry 912 may comprise a processor 914, wherein processor 914 may for example be an application-specific integrated circuit (ASIC), a sea of gates, a field-programmable gate array (FPGA), a central processing unit (CPU) or a graphics processing unit (GPU). The circuitry 912 may further comprise a memory 916, e.g. a non-volatile memory such as a flash memory. The memory 916 may store machine-readable instructions for execution by the processor 914 to provide some or all of the functionality described herein. In some examples, the circuitry 912 may comprise a power regulator 918, for example a current regulator, e.g., similar as described for circuitry 204 above.

Figure 10:
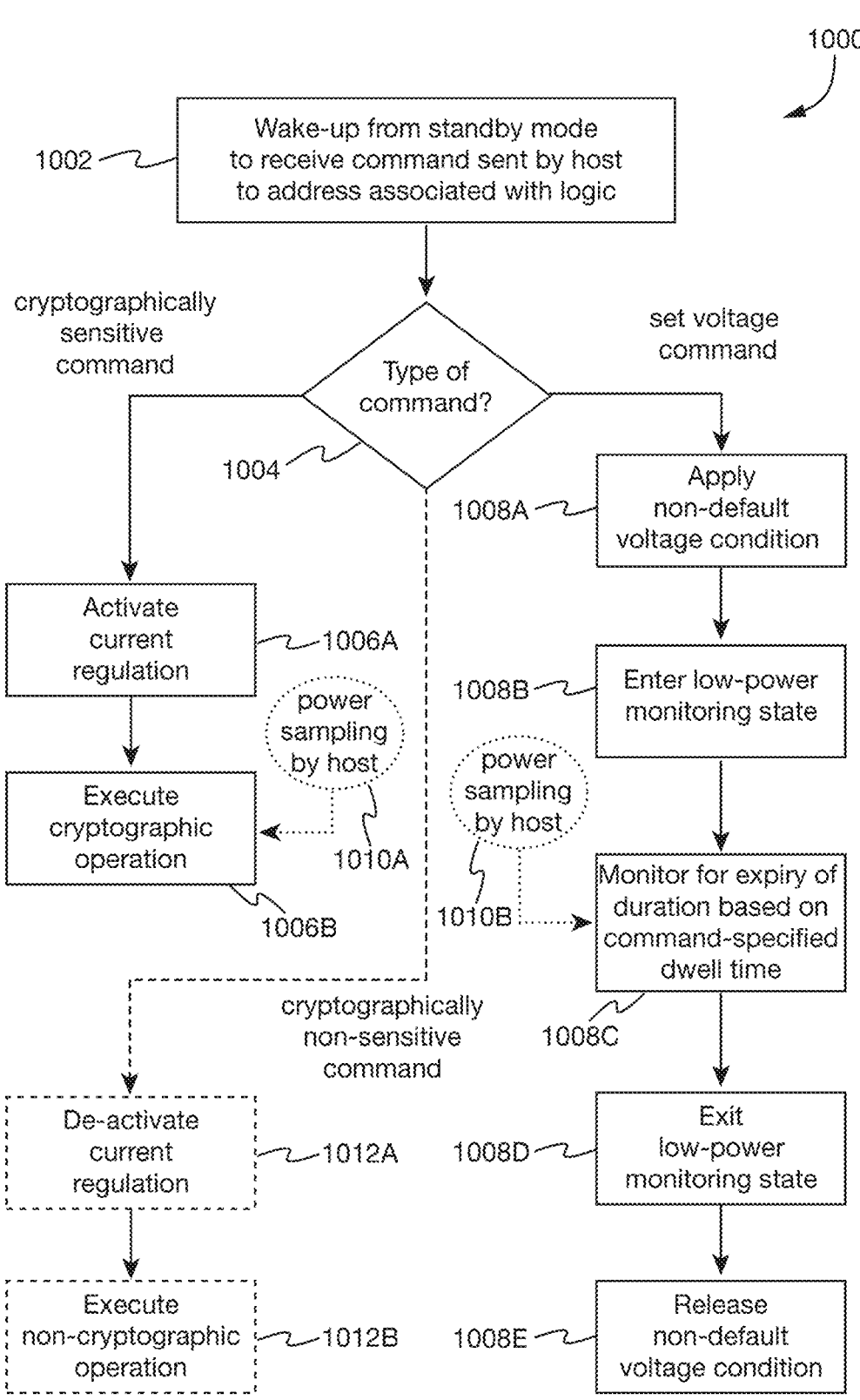
FIG. 10: a method of operating circuitry for association with a replaceable print apparatus component according to another example.

FIG. 10 depicts a flow chart of a method 1000 in accordance with another example. The method 1000 may for example be executed by circuitry for association with a replaceable print apparatus component according to any of the examples described herein, e.g., the circuitry 204 of FIG. 2 or the circuitry 912 of FIG. 9*b*, the latter of which is used as a non-limiting example for illustration purposes in the following. The circuitry executing method 600 may interface, e.g., via interface 204 or 910, with a serial bus such as the serial data bus 800 of FIG. 8, which is also used as a non-limiting example for illustration purposes with the print cartridge 900 and interface 910 as non-limiting examples for a replaceable print apparatus component 814*a-d* and secondary device 812*a-d*, respectively. Via the serial bus, the circuitry may communicate (e.g., securely) with a host such as a host apparatus (e.g., print apparatus), which may comprise the host or primary device 808. The method 1000 is not limited to the order of execution indicated by the flow chart in FIG. 10. As far as technically feasible, the method 1000 may be executed in an arbitrary order and steps thereof may also be executed simultaneously at least in part.

Figures 11, 12:
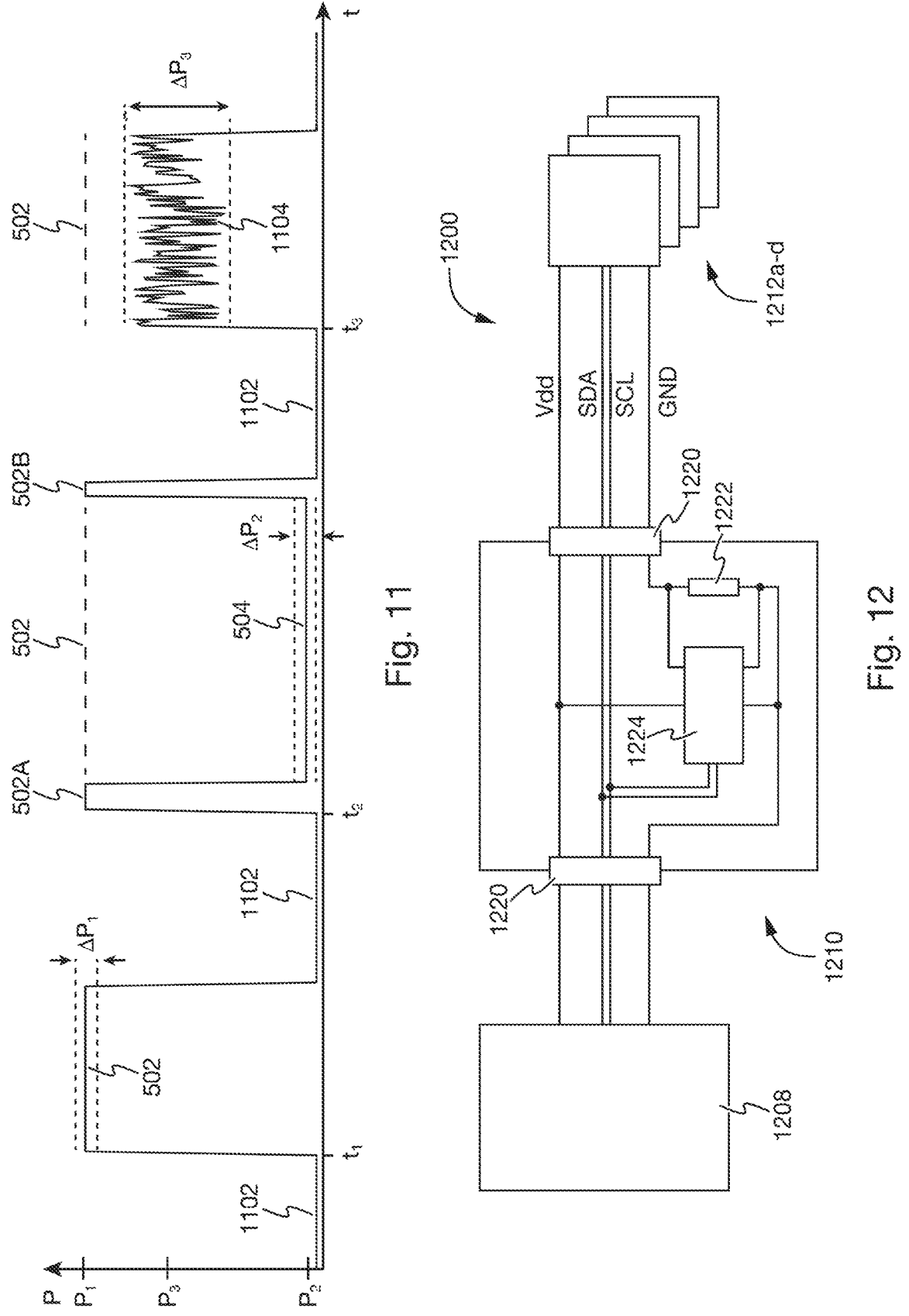
FIG. 11: a power consumption of circuitry associated with a replaceable print apparatus component during execution of operations associated with commands from a host according to an example.
FIG. 12: an electronic block diagram of a serial data bus of a host apparatus according to another example.

FIG. 11 schematically illustrates a power consumption P (e.g., a supply current as measured by the sampling device 810) of the circuitry 912 as a function of time t during execution of the method 1000.

Similar to method 700, the circuitry 912 may initially be in a standby mode in which the circuitry 912 may wait for the next command from the host addressed to the circuitry 912 via the I2C bus 800. In standby mode, the circuitry 912 may not execute any operations and may thus have a very low power consumption as indicated by line 1102 in FIG. 11. The power consumption in the standby mode may for example be equal to or lower than in the low-power monitoring state that the circuitry 912 enters in block 1008B (line 504).

At a first time $t_1$, the circuitry 912 may receive, via the I2C bus 800, a first command from the host addressed to the circuitry 912. In response, the circuitry 912 may wake-up from standby mode in block 1002 to receive and process the first command, e.g., similar to block 702 of method 700. The circuitry 912 may then determine a type of the first command in block 1004, e.g., similar to block 704.

In the example of FIG. 10, the circuitry 912 may distinguish between two different types of commands, namely commands associated with a cryptographic operation (referred to as 'cryptographically sensitive commands" in FIG. 10 and below) and set voltage commands (which may, e.g., specify a dwell time for which the circuitry 912 is to generate a non-default voltage condition on the I2C bus 800, i.e., a non-cryptographic operation). Optionally, as illustrated by the dashed lines in FIG. 10, the circuitry 912 may also distinguish a third type of commands such as commands associated with a non-cryptographic operation different from set voltage commands (referred to as 'cryptographically non-sensitive commands' in FIG. 10 and below).

In the example of FIG. 11, the first command is a cryptographically sensitive command. In response, the circuitry 912 enters a default-power state in block 1006A by activating a current regulator such as the current regulator 918 for maintaining (e.g., regulating) the power consumption within a first range (e.g., a first current range or band) as illustrated by solid line 502 in FIG. 11. The first range may for example be centered around an average power consumption $P_1$ and have a first width $\Delta P_1$ as detailed above with reference to FIGS. 4 and 5. In some examples the circuitry 912 may already enter the default-power state in block 1002 or 1004, in which case the circuitry 912 may simply remain in the default-power state in block 1006A.

In the default-power state, the circuitry 912 executes a cryptographic operation associated with (e.g., specified by) the first command in block 1006B. Using the current regulator 918, the circuitry 912 may ensure that its power consumption remains within the (narrow) first range independent of the actions or tasks performed by the circuitry 912 as part of the cryptographic operation. This may prevent an attacker from obtaining cryptographically relevant information by monitoring the power consumption of the circuitry 912. After completion of the cryptographic operation, which may, e.g., comprise providing a result thereof for retrieval by the host, the circuitry 912 may exit the default-power state (e.g., deactivate the current regulator 918) and may for example return to the standby state as illustrated in FIG. 11.

At a second time $t_2$, the circuitry 912 may receive, via the I2C bus 800, a second command from the host addressed to the circuitry 912. In response, the circuitry 912 may again wake-up from standby mode in block 1002 and determine a type of the second command in block 1004 as described above.

In the example of FIG. 11, the second command is a set voltage command. The set voltage command may request the circuitry to generate a non-default voltage condition on the I2C bus 800, e.g., on the data line SDA. The non-default voltage condition may for example be a low-voltage condition, e.g., a condition in which the voltage on the data line SDA (e.g., as measured by sampling device 810) is below the default voltage (e.g., the HIGH voltage) as generated by the second voltage source 804. The low-voltage condition may for example correspond to a configuration in which the circuitry 912 (i.e., the secondary device 812*a-d* addressed by the set voltage command) pulls the data line SDA low, e.g., by connecting the data line SDA to the ground line GND (ground condition). In other examples, the non-default or low-voltage condition may correspond to a condition in which the voltage on the data line SDA is at another value, e.g., a value between voltages of the default and ground conditions.

The set voltage command may specify a dwell time (or time period), which may for example indicate a time period during which the host expects the circuitry 912 to generate the non-default voltage condition. The host may for example sample the voltage on the data line SDA, e.g., via the sampling device 810, at one or more sampling points before, during and/or after this time period, e.g., to determine whether the print cartridge 900 is in the correct position (e.g., a correct cartridge slot) and/or to determine whether the circuitry 912 is capable of observing the specified time period (e.g., monitoring for expiry thereof).

In response to the set voltage command, the circuitry 912 may apply (e.g., start generating) the non-default voltage condition in block 1008A, for example by pulling the data line SDA low.

Subsequently, the circuitry 912 may enter a low-power monitoring state (as an example of a low-power state) in block 1008B. In the low-power monitoring state, the power consumption of the circuitry 912 may be within a second range (e.g., a second current range or band) as illustrated by solid line 504 in FIG. 11 (with dashed line 502 associated with the default-power state shown for comparison). The second range may for example be centered around an average power consumption $P_2$ and have a second width $\Delta P_2$ as detailed above with reference to FIGS. 4 and 5. In some examples, power consumption of the circuitry 912 may be regulated in the low-power monitoring state similar to the default-power state, e.g. using current regulator 918. In other examples, the circuitry 912 may allow its power consumption to fluctuate or vary in the low-power monitoring state, e.g., similar as described below for the third (unregulated) power state.

Before entering the low-power monitoring state (e.g., during some or all of blocks 1002, 1004 and 1008A), the circuitry 912 may temporarily consume more power than in the low-power monitoring state as schematically illustrated by peak 502A in FIG. 11, for example as a result of actions or task performed by the circuitry 912 in the respective block. In some examples, the circuitry 912 may temporarily enter the default-power state (which may include activating the current regulation similar to block 1006A), for example to perform a cryptographic task such as confirming authentication of the set voltage command (e.g., validating a message authentication code associated therewith). In some examples, power consumption during peak 502A or a part thereof may be the same or similar as in the default-power state (e.g., in the first range). Additionally or alternatively, the circuitry 912 may temporarily enter another power-state (e.g., an unregulated power state such as the third power state as described below).

The circuitry 912 may remain in the low-power monitoring state for a duration based on the dwell time specified in the set voltage command, e.g., similar to block 408 of method 400. For this, the circuitry 912 may monitor for expiry of the duration based on the dwell time in the low-power monitoring state in block 1008C, e.g., using a timer or delay circuit. In some examples, the duration may be equal or approximately equal (e.g., up to a small offset, which may be fixed or may vary) to the dwell time or a fraction or multiple thereof (e.g., one half, one third, one quarter or the like of the dwell time).

Upon expiry of the duration, the circuitry 912 may exit the low-power monitoring state in block 1008D. This may be associated with another temporary increase in the power consumption of the circuitry 912 as schematically illustrated by peak 502B, which may be similar to peak 502A (e.g., in one or both of amplitude and duration). The circuitry may for example return to the default-power state, e.g., to generate an authenticated response or confirmation for the host, or to another power-state (e.g., an unregulated power state such as the third power state as described below).

While in the low-power state, the circuitry 912 may continue to generate the non-default voltage condition in some examples, e.g., such that the I2C bus (e.g., the data line SDA) is continuously in the non-default voltage condition. In block 1008E, the circuitry 912 may release the non-default voltage condition, for example to allow the I2C bus 800 (e.g., the date line SDA) to return to the default voltage condition (e.g., to be driven high by the second voltage source 804 via pull-up resistor 806). A duration for which the non-default voltage condition is generated between blocks 1008A and 1008E may be based on the dwell time. In some examples, this duration may be equal or approximately equal (e.g., up to a fixed offset) to the duration for which the circuitry 912 remains in the low-power monitoring state. After block 1008E, the circuitry 912 may return to standby mode as illustrated by line 1102 in FIG. 11.

The response of the circuitry 912 is not limited to the particular example shown in FIG. 10 and may differ from the example given above in various aspects. For example, the circuitry 912 may apply the non-default voltage condition in block 1008A after entering the low-power monitoring state in block 1008B and/or may release the non-default voltage condition in block 1008E prior to exiting the low-power monitoring state in 1008D.

Furthermore, the circuitry 912 may not generate the non-default voltage condition continuously between blocks 1008A and 1008E but may for example release and re-apply the non-default voltage condition temporarily (e.g., intermittently) or may generate the non-default voltage condition temporarily (e.g., intermittently). The circuitry 912 may, for example, generate the non-default voltage condition at least (in some examples only) during one or more expected sampling points at which the host is expected to sample the voltage on the I2C bus 800 (e.g., the data line SDA). The expected sampling points may be based on (e.g., depend on) the dwell time. For example, a first sampling point may be at a (e.g., predefined) settling time after issuing or receiving the set voltage command. In some examples, a second sampling point may be at a (e.g., predefined) time offset before the end of dwell time. All of the above may be referred to by the expression "generate a non-default voltage condition for a duration based on a dwell time". The circuitry 912 may be to derive (e.g., determine, estimate or guess) the sampling points from the specified dwell time.

Similarly, the circuitry 912 may not remain in the low-power monitoring state continuously between blocks 1008B and 1008D but may for example temporarily (e.g., intermittently) exit the low-power monitoring state. In some examples, the circuitry 912 may do so for modifying the voltage condition on the I2C bus, e.g., to apply and/or release the non-default voltage condition, for example around an expected sampling point. The above may also be encompassed by the expression "transition to a low-power (monitoring) state for a duration based on a dwell time".

In some examples, the set voltage command may request the circuitry 912 to generate a voltage condition on a contact of the circuitry 912 (either instead of or in addition to generating the non-default voltage condition on the serial data bus), for example to drive a contact pad or contact pin of the circuitry 912 to a voltage specified in the set voltage command. The contact may for example be a general-purpose input output (GPIO) contact of the circuitry 912 that is not connected to the serial data bus but, e.g., to another device.

In some examples, the second command may be a dwell command, which may for example request the circuitry 912 to remain in the low-power monitoring state for the dwell time specified in the dwell command or a duration based thereon (but may, e.g., not request the circuitry 912 to generate a voltage condition on the serial data bus or a contact). In such examples, steps 1008A and 1008E may be omitted.

As used herein, the second command (specifying a dwell time and/or associated with a non-cryptographic operation) may refer to either one of the aforementioned commands, i.e., a set voltage command requesting the circuitry 912 to generate the non-default voltage condition on the serial data bus, a set voltage command requesting the circuitry 912 to generate a voltage condition on a contact of the circuitry 912 and a dwell command. In some examples, the circuitry 912 may also be configured to provide the response to the second command described herein to some (i.e., two) or all of these three commands. For example, the circuitry 912 may be configured to execute some or all of steps 1008A-E (e.g., at least steps 1008B-1008D) in response to each of these three commands.

In some examples, the host may sample, e.g., using sampling device 810, a power consumption via the I2C bus 800 (e.g., a supply current on the voltage supply line Vdd or the ground line GND), for example to confirm whether the circuitry 912 or print cartridge 900 complies with certain power requirements, e.g., consumes power within a certain range at one or more sampling points. Power consumption via the I2C bus 800 may correlate with power consumption of the circuitry 912 or print cartridge 900, e.g., because the other secondary devices 812*a-d* are in standby mode, in which power consumption may be negligibly small (or accounted for by appropriate margins). In some examples, I2C bus 800 may also be adapted appropriately so as to allow for independently switching power to each of the secondary devices 812*a-d*.

For example, the host may sample the power consumption via the I2C bus 800 at one or more sampling points at which the circuitry 912 is expected to be in the default-power state, e.g., to confirm whether power consumption is consistent with (e.g., within a certain margin of or within) the first range. As illustrated in FIG. 10, the host may, e.g., sample the power consumption in block 1010A at one or more sampling points while the circuitry 912 executes the cryptographic operation in block 1006B. In some examples, the host may (in addition to or instead of block 1010A) sample the consumption at one or more sampling points during peaks 502A and/or 502B, while the associated time scales may be too short for proper sampling in other cases.

Additionally or alternatively, the host may sample the power consumption via the I2C bus 800 at one or more sampling points at which the circuitry 912 is expected to be in a low-power state such as the low-power monitoring state, e.g., to confirm whether power consumption is consistent with (e.g., within a certain margin of or within) the second range. As illustrated in FIG. 10, the host may, e.g., sample the power consumption in block 1010B at one or more sampling points while the circuitry 912 monitors for expiry of the duration based on the dwell time in block 1008C.

The circuitry 912 may use or transition to the default-power state for all commands (e.g., including both cryptographically sensitive and non-sensitive commands) other than the set voltage command or a predefined subset of commands including the set voltage command. In other examples, as mentioned above, the circuitry 912 may also distinguish between more than two types of commands in some examples and selectively transition into respective power modes. In addition to the default-power state for cryptographically sensitive commands and the low-power state for set voltage commands, the circuitry 912 may for example also provide a third power state (or mode) for cryptographically non-sensitive commands (other than set voltage commands) as also illustrated in FIG. 10. Cryptographically non-sensitive commands may be commands that are associated with a non-cryptographic operation (e.g., a non-cryptographic operation that is different from one or both of monitoring for a duration and generating a non-default-voltage condition).

The circuitry 912 may for example receive, via the I2C bus 800, such a cryptographically non-sensitive (third) command from the host addressed to the circuitry 912 at a third time $t_3$ as illustrated in FIG. 11. In response, the circuitry 912 enters the third power state in block 1012A, for example by de-activating (or not activating) the current regulator 918 for maintaining the power consumption of the circuitry 912. The third power state may thus be an unregulated state in which the power consumption of the circuitry 912 (e.g., the supply current drawn by the circuitry 912 over the I2C bus 800) is not regulated but allowed to fluctuate or vary freely as illustrated by line 1104 in FIG. 11. In the third power state, the circuitry 912 may for example exhibit its intrinsic power consumption associated with a respective operation executed by the circuitry 912 in the third power state. In the third power state (also referred to as the unregulated state in the following), the circuitry 912 may consume power in a broadened range (e.g., draw a supply current in a broadened current range). For example, as illustrated in FIG. 11, a width $\Delta P_3$ of the broadened range may be considerably larger than both of the width $\Delta P_1$ of the first range (default-power mode) and the width $\Delta P_2$ of the second range (low-power mode). An average power consumption $P_3$ of the circuitry 912 in the unregulated power state may be between the average power consumption $P_1$ in the default-power state and the average power consumption $P_2$ in the low-power monitoring state. A lower limit of the broadened range may be higher than an upper limit of the second range. An upper limit of the broadened range may be equal to or lower than an upper limit of the first range, in some examples equal to or lower than a lower limit of the first range. Choosing the first range (e.g., its lower limit) to be equal to or larger than the upper limit of the (unregulated) broadened range, e.g., as illustrated in FIG. 11, may for example ensure that power consumption of the circuitry 912 in the (regulated) default-power mode is sufficiently large to accommodate variations in the (unregulated) intrinsic power consumption of the circuitry 912 associated with execution of the cryptographic operation.

In the unregulated power state, the circuitry 912 may execute the non-cryptographic operation associated with (e.g., specified by) the third command in block 1012B. As the non-cryptographic operation may not involve the use of sensitive information such as cryptographic keys, monitoring the (unregulated) power consumption of the circuitry 912 while performing the non-cryptographic operation may not yield any cryptographically relevant information. De-activating (or not activating) the current regulation may thus allow for reducing the power consumption of the circuitry 912 without compromising security.

In addition or instead of the blocks 1002-1012 and/or the actions described above, the method 1000 may comprise other blocks and/or actions associated with other methods according to the examples described herein, in particular some or all of blocks 402-408 of method 400, blocks 602-608 of method 600 and blocks 702-708 of method 700 described above. Put differently, the circuitry (e.g., logic or secure controller) executing method 1000 may additionally or alternatively also be to execute some or all of the respective blocks or actions.

FIG. 12 shows a schematic illustration of a serial data bus 1200 (e.g., an I2C bus) in accordance with an example. The serial data bus 1200 is similar to the serial data bus 800 of FIG. 8 and may for example be provided as part of a host apparatus. In the example of FIG. 12, the serial data bus 1200 provides a communication link between a primary or host device 1208 (which may be part of the host apparatus and may be similar to host device 808 described above) and a plurality of secondary devices 1212*a-d* (which may be similar to secondary devices 812*a-d* described above).

A sampling device 1210 is coupled along the serial data bus 1200, for example via a pair of interfaces (e.g., connectors or contact pads) 1220. The sampling device 1210 may be provided as part of the host apparatus and in some examples may be integrated with the primary device 1208 in one unit (e.g. package). In other examples, the sampling device 1210 may be provided separate from the primary device 1208 or the host apparatus, e.g., as an independent unit.

The sampling device 1210 is to sample (e.g., determine or measure) a current on the ground line GND of the serial data bus, for example to sample a supply current of one of the secondary devices 1212*a-d* or a cumulative supply current for some or all of the secondary device 1212*a-d*. For this, the sampling device 1210 comprises a sampling resistor 1222 that is coupled along the ground line GND and a voltmeter (voltage sensing device) 1224. The voltmeter 1224 is to measure a voltage drop over the sampling resistor 1222, which may be used to determine a current (e.g., a supply current) on the ground line GND (e.g., by the voltmeter 1224 (which may also function as an ammeter or current monitor in some examples), by the sampling device 1210, or another entity such as the primary device 1208 or the host apparatus). The sampling resistor 1222 may have a known resistance, e.g., between 1 mOhm and 100 mOhm. The resistance may for example be chosen to be sufficiently large to allow for a reliable sampling of the current while being sufficiently small so as to not interfere with operation of the serial data bus 1200.

In some examples, the sampling device 1210 (e.g., the voltmeter 1224) may be to communicate via the serial data bus 1200 as illustrated in FIG. 12, for example with one or both of the primary device 1208 and the secondary devices 1212*a-d*. Additionally or alternatively, the sampling device 1210 may also communicate (e.g., with the primary device 1208 and/or the secondary devices 1212*a-d*) via a separate communications link provided in addition to the serial data bus 1200. This may for example allow the sampling device 1210 to communicate while a non-default voltage condition is being generated on the serial data bus 1200. In some examples, the sampling device 1210 may be to sample a voltage (or current) on other lines of the serial data bus 1200, for example on the data line SDA.

In some examples, the disclosure comprises any of the following items:

1. A secure controller for a replaceable print apparatus component, wherein the controller is to perform secure communication with a host apparatus via a serial data bus, wherein the controller is to:

in response to a first command from the host apparatus, execute a first operation associated with the first command, wherein the controller is to consume power within a first range during execution of the first operation; and in response to a second command from the host apparatus, for example specifying a (dwell) time, transition to a low-power state and consume power within a second range in the low-power state for a first duration, the first duration for example being based on the (dwell) time, the second range being below and for example spaced apart from the first range.

2. The secure controller of item 1, wherein the first operation is a cryptographic operation.

3. The secure controller of item 1 or 2, wherein the controller is to maintain the power consumption of the controller within the first range during the execution of the first operation, for example by one or both of smoothing the power consumption and jamming the power consumption.

4. The secure controller of any preceding item, wherein a standard deviation of the power consumption of the controller during the execution of the first operation is less than 20% of an average power consumption of the controller during the execution of the first operation.

5. The secure controller of any preceding item, wherein an average power consumption of the controller in the low-power state is less than 20% of the average power consumption of the controller during the execution of the first operation.

6. The secure controller of any preceding item, wherein an upper limit of the second range is less than 50% of a lower limit of the first range.

7. The secure controller of any preceding item, comprising a timer having a frequency that is independent of a clock frequency on the serial data bus, wherein the controller is configured to run the timer during the low-power state.

8. The secure controller of any preceding item, wherein the low-power state is a low-power monitoring state for monitoring for expiry of the first duration.

9. The secure controller of any preceding item, wherein the controller is to generate a non-default voltage condition on the serial data bus in the low-power state.

10. The secure controller of any preceding item, wherein the controller comprises serial bus interfaces including data, clock, power, and/or ground, whereby the controller is configured to generate a low voltage condition on the data interface in response to the second command for a second duration based on the dwell time of the second command, wherein the second duration is equal to or different from the first duration, and generate a low-power state on an interface other than the data interface, in response to the second command for the first duration.

11. The secure controller of any preceding item, wherein the controller, in response to the second command, is to generate a non-default voltage condition on a line of the serial data bus during a first point in time and during a second point in time, the first and second points in time being separated by a duration based on the dwell time, e.g., a third duration equal to or shorter than the second duration.

12. The secure controller of any preceding item, wherein the controller, in response to the second command, is to generate the low-power state on a line of the serial data bus during a third point in time and during a fourth point in time, the third and fourth points in time being separated by a duration based on the dwell time, e.g., a fourth duration equal to or shorter than the first duration.

13. The secure controller of any preceding item, further comprising a serial data bus interface that is to interface with a serial data bus of the host apparatus, wherein the controller is to:

in response to the first command received from the host apparatus via the serial data bus, the first command being associated with a cryptographic operation (e.g., the first operation), execute the cryptographic operation in a default-power state; and in response to the second command received from the host apparatus via the serial data bus, the second command being associated with a non-cryptographic operation, enter a low-power state associated with the non-cryptographic operation for executing the non-cryptographic operation, wherein a supply current of the circuitry in the default-power state is higher than in the low-power state.

14. The secure controller of any preceding item, wherein the second command specifies a time period (e.g., the dwell time) and the controller is to exit the low-power state upon expiry of a duration based on the time period.

15. The secure controller of any preceding item, wherein the second command is associated with a non-cryptographic operation and executing the non-cryptographic operation comprises generating a non-default voltage condition on the serial data bus (e.g., in the low-power state).

16. The secure controller of any preceding item, wherein the controller further is to enter a standby state upon completion of execution of an operation, the standby state differing from the low-power state in at least one of an exit condition for exiting the respective state and a supply current (or power consumption) of the controller in the respective state.

17. The secure controller of any preceding item, wherein a supply current of the controller during execution of the first operation (e.g., in the default-power state) is within a predefined first current band.

18. The secure controller of any preceding item, wherein a supply current of the circuitry in the low-power state is within a predefined second current band.

19. The secure controller of any preceding item, further comprising a current regulator, wherein the current regulator for example is to maintain the supply current of the controller to be within the predefined first current band during execution of the first operation and/or within the predefined second current band in the low-power state.

20. The secure controller of any preceding item, wherein the second command is authenticated by the host apparatus and the controller, in response to the second command, is to confirm authentication of the second command while consuming power within the first range (e.g., in the default-power state) prior to transitioning to the low-power state (e.g., for executing the non-cryptographic operation).

21. The secure controller of any preceding item, wherein one or both of:
    the host apparatus is to sample a supply current on the serial data bus after issuing the first command and the controller is to consume power within the first range at least at an expected sampling time at which the host apparatus is expected to sample the supply current after issuing the first command; and
    the host apparatus is to sample the supply current on the serial data bus after issuing the second command and the controller is to be in the low-power state at least at an expected sampling time at which the host apparatus is expected to sample the supply current after issuing the second command.

22. The secure controller of any preceding item, wherein the controller, in response to a command (e.g., the first command and/or the second command) sent by the host apparatus over the serial bus to an address associated with the controller, is to:
    depending on a type of the command sent to the address associated with the controller, selectively transition to either a first power mode (for example for a first type of command including the first command, e.g., to the default-power state) or a second power mode (for example for a second type of command including the second command, e.g., to the low-power state) for executing an operation associated with the received command, wherein the first power mode and the second power mode differ from each other in a supply current (or power) drawn by the controller over the serial bus in the respective power mode.

23. The secure controller of any preceding item, wherein the controller is to, during execution of the first operation (e.g., in the first power mode), draw a supply current in a first current range over the serial data bus, and,
in the low-power mode (e.g., in the second power mode), draw a supply current in a reduced-current range over the serial data bus, the reduced-current range being less than, and distanced from, the first current range.

24. The secure controller of item 23, wherein a center of the reduced-current range is less than 20% of a center of the first current range.

25. The secure controller of any preceding item, wherein the controller is further to,
    depending on the type of a command sent to an address associated with the controller, transition to either the first power mode (e.g., default-power state), the second power mode (e.g., low-power state) or a third power mode, and
    in the third power mode, draw a power (or supply current) in a broadened power or current range over the serial bus, the broadened power range (or current range) being broader than the first range (or first current range) and the second range (or reduced-current range) and extending at least between the first and second ranges (or between the first current range and the reduced-current range).

26. The secure controller of item 25, wherein one or both of the first and second power modes are regulated power modes in which the power or supply current drawn by the controller over the serial bus is regulated and the third power mode is an unregulated power mode in which the power or supply current drawn by the controller over the serial bus is unregulated.

27. The secure controller of any one of items 22 to 26, wherein the controller is to:
    draw the supply current in the first power mode for a duration based on a time period (e.g., the dwell time) specified in the command sent to the address associated with the controller (e.g., in the first command); and/or
    draw the supply current in the second power mode for a duration based on a time period (e.g, the dwell time) specified in the command sent to the address associated with the controller (e.g., in the second command).

28. A replaceable print apparatus component comprising the secure controller of any one of the preceding items.

In some examples, the disclosure comprises any of the following statements:

1. Circuitry for association with a replaceable print apparatus component, the circuitry comprising a serial data bus interface that is to interface with a serial data bus of a host apparatus, wherein the circuitry is to:
    in response to a first command received from the host apparatus via the serial data bus, the first command being associated with a first (e.g., cryptographic) operation, execute the first operation in a default-power state; and
    in response to a second command received from the host apparatus via the serial data bus, the second command being associated with a second (e.g., non-cryptographic) operation, enter a low-power state associated with the second operation for executing the second operation, wherein a supply current (or power consumption) of the circuitry in the default-power state is higher than in the low-power state.

2. The circuitry of statement 1, wherein the circuitry is to perform secure communication with the host apparatus via the serial data bus and/or wherein the circuitry is to:

in response to the first command from the host apparatus, execute the first operation associated with the first command, wherein the circuitry is to, e.g., consume supply current or power within a first range during execution of the first operation; and in response to the second command from the host apparatus, the second command, e.g., specifying a dwell time, transition to a low-power state and consume supply current or power within a second range in the low-power state for a first duration, the first duration, e.g., being based on the dwell time, the second range being below and, e.g., spaced apart from the first range.

3. The circuitry of statement 1 or 2, wherein the first operation is a cryptographic operation.

4. The circuitry of any preceding statement, wherein the circuitry is to maintain the supply current (or power consumption) of the circuitry within the first range during the execution of the first operation, e.g., by one or both of smoothing the supply current or power consumption and jamming the supply current or power consumption.

5. The circuitry of any preceding statement, wherein a standard deviation of the supply current (or power consumption) of the circuitry in the default-power state (e.g., during the execution of the first operation) is less than 20% of an average supply current (or average power consumption) of the circuitry in the default-power state (e.g., during the execution of the first operation).

6. The circuitry of any preceding statement, wherein an average supply current (or average power consumption) of the circuitry in the low-power state is less than 20% of the average supply current or power consumption of the circuitry in the default-power state (e.g., during the execution of the first operation).

7. The circuitry of any preceding statement, wherein an upper limit of the supply current in the low-power state (or an upper limit of the second range) is less than 50% of a lower limit of the supply current in the default-power state (or a lower limit of the first range).

8. The circuitry of any preceding statement, comprising a timer having a frequency that is independent of a clock frequency on the serial data bus, wherein the circuitry is configured to run the timer during the low-power state.

9. The circuitry of any preceding statement, wherein the low-power state is a low-power monitoring state for monitoring for expiry of a duration based on a time period (e.g., the dwell time) specified by the second command.

10. The circuitry of any preceding statement, wherein the circuitry is to generate a non-default voltage condition on the serial data bus in the low-power state.

11. The circuitry of any preceding statement, wherein the circuitry comprises serial bus interfaces including data, clock, power, and/or ground, whereby the circuitry is configured to generate a low voltage condition on the data interface in response to the second command for a duration (e.g., the second duration), the duration, e.g., being based on a time period specified by the second command (e.g., the dwell time), wherein said duration is, e.g., equal to or different from the first duration, and generate a low-power state on an interface other than the data interface, in response to the second command for a duration (e.g., the first duration), the duration, e.g., being based on a time period specified by the second command (e.g., the dwell time).

12. The circuitry of any preceding statement, wherein the circuitry, in response to the second command, is to generate a non-default voltage condition on a line of the serial data bus during a first point in time and during a second point in time, the first and second points in time being separated by a duration that is, e.g., based on a time period specified by the second command (e.g., the dwell time), e.g., a third duration equal to or smaller than the second duration.

13. The circuitry of any preceding statement, wherein the circuitry, in response to the second command, is to generate the low-power state on a line of the serial data bus during a third point in time and during a fourth point in time, the third and fourth points in time being separated by a duration that is, e.g., based on a time period specified by the second command (e.g., the dwell time), e.g., a fourth duration equal to or smaller than the first duration.

14. The circuitry of any preceding statement, wherein the second command specifies a time period (e.g., the dwell time) and the circuitry is to exit the low-power state upon expiry of a duration based on the time period.

15. The circuitry of any preceding statement, wherein executing the non-cryptographic operation comprises generating a non-default voltage condition on the serial data bus.

16. The circuitry of any preceding statement, wherein the circuitry further is to enter a standby state upon completion of execution of an operation, the standby state differing from the low-power state in at least one of an exit condition for exiting the respective state and a supply current of the circuitry in the respective state.

17. The circuitry of any preceding statement, wherein the supply current of the circuitry in the default-power state is within a predefined first current band.

18. The circuitry of any preceding statement, wherein the supply current of the circuitry in the low-power state is within a predefined second current band.

19. The circuitry of any preceding statement, further comprising a current regulator, wherein the current regulator for example is to maintain the supply current of the circuitry to be within the predefined first current band in the default-power state and/or within the predefined second current band in the low-power state.

20. The circuitry of any preceding statement, wherein the second command is authenticated by the host apparatus and the circuitry, in response to the second command, is to confirm authentication of the second command in the default-power state prior to entering the low-power state for executing the non-cryptographic operation.

21. The circuitry of any preceding statement, wherein one or both of:

the host apparatus is to sample a supply current on the serial data bus after issuing the first command and the circuitry is to be in the default-power state at least at an expected sampling time at which the host apparatus is expected to sample the supply current after issuing the first command; and the host apparatus is to sample the supply current on the serial data bus after issuing the second command and the circuitry is to be in the low-power state at least at an expected sampling time at which the host apparatus is expected to sample the supply current after issuing the second command.

22. The circuitry of any preceding statement, wherein the circuitry, in response to a command sent by the host apparatus over the serial data bus to an address associated with the circuitry, is to:

depending on a type of the command sent to the address associated with the circuitry, selectively transition to either a first power mode (e.g., the default-power state) or a second power mode (e.g., the low-power state) for executing an operation associated with the received command, wherein the first power mode and the second power mode differ from each other in a supply current (or power) drawn by the circuitry over the serial data bus in the respective power mode.

23. The circuitry of any preceding statement, wherein the circuitry is to, in the default-power state (e.g., in first power mode), draw a supply current (or power) in a first current range over the serial data bus, and, in the low-power state (e.g., in the second power mode), draw a supply current (or power) in a reduced-current range over the serial data bus, the reduced-current range being less than, and distanced from, the first current range.

24. The circuitry of statement 23, wherein a center of the reduced-current range is less than 20% of a center of the first current range.

25. The circuitry of any preceding statement, wherein the circuitry is further to, depending on a type of command sent to the address associated with the circuitry, transition to either the first power mode (e.g., the default-power state), the second power mode (e.g., the low-power state) or a third power mode, and in the third power mode, draw a supply current (or power) in a broadened current range over the serial bus, the broadened current range being broader than the first current range (or the first range) and the reduced-current range (or the second range) and extending at least between the first current range and the reduced-current range (or between the first and second ranges).

26. The circuitry of statement 25, wherein one or both of the first and second power modes are regulated power modes in which the supply current (or power) drawn by the circuitry over the serial bus is regulated and the third power mode is an unregulated power mode in which the supply current (or power) drawn by the circuitry over the serial bus is unregulated.

27. The circuitry of any preceding statement, wherein the circuitry is to:

draw the supply current (or power) in the first power mode for a duration based on a dwell time (e.g., the time period) specified in the command sent to the address associated with the circuitry; and/or draw the supply current (or power) in the second power mode for a duration based on a dwell time (e.g., the time period) specified in the command sent to the address associated with the circuitry.

28. A replaceable print apparatus component comprising the circuitry of any one of the preceding statements.

In some examples, the disclosure comprises any of the following clauses:

1. A replaceable print apparatus component comprising:

a serial bus interface to communicate with a host over a serial bus; and logic, wherein the logic, in response to a command sent by the host over the serial bus to an address associated with the logic, is to:

depending on a type of the command sent to the address associated with the logic, selectively transition to either a first power mode or a second power mode for executing an operation associated with the received command, wherein the first power mode and the second power mode differ from each other in a supply current (or power) drawn by the logic over the serial bus in the respective power mode.

2. The replaceable print apparatus component of clause 1, wherein the logic is a secure controller that is to perform secure communication with the host via the serial bus and/or wherein the logic is to:

in response to a first command from the host apparatus, execute a first operation associated with the first command, wherein the logic is to consume power within a first range during execution of the first operation (e.g., by transitioning to the first power mode for execution of the first operation); and in response to a second command from the host apparatus, the second command, e.g., specifying a dwell time, transition to a low-power state (e.g., as the second power mode) and consume power within a second range in the low-power state for a first duration that is, e.g., based on the dwell time, the second range being below and, e.g., spaced apart from the first range.

3. The replaceable print apparatus component of clause 1 or 2, wherein the operation associated with the first power mode (e.g., the first operation) is a cryptographic operation.

4. The replaceable print apparatus component of any preceding clause, wherein the logic is to maintain the power consumption of the logic within a first range in the first power mode (e.g., during the execution of the first operation), for example by one or both of smoothing the power consumption and jamming the power consumption.

5. The replaceable print apparatus component of any preceding clause, wherein a standard deviation of the supply current or power consumption of the logic in the first power mode (e.g., during the execution of the first operation) is less than 20% of an average supply current or average power consumption of the logic in the first power mode (e.g., during the execution of the first operation).

6. The replaceable print apparatus component of any preceding clause, wherein an average supply current (or average power consumption) of the logic in the second power mode (e.g., in the low-power state) is less than 20% of the average supply current or average power consumption of the logic in the first power mode (e.g., during the execution of the first operation).

7. The replaceable print apparatus component of any preceding clause, wherein an upper limit of the supply current or power consumption in the second power mode (e.g., an upper limit of the second range) is less than 50% of a lower limit of the supply current or power consumption in the first power mode (e.g., a lower limit of the first range).

8. The replaceable print apparatus component of any preceding clause, comprising a timer having a frequency that is independent of a clock frequency on the serial bus, wherein the logic is configured to run the timer during the second power mode (e.g., low-power state).

9. The replaceable print apparatus component of any preceding clause, wherein the second power mode (e.g., the low-power state) is a low-power monitoring state for monitoring for expiry of a duration based on a time period (e.g., the dwell time) specified in the command of the respective type (e.g., the first duration).

10. The replaceable print apparatus component of any preceding clause, wherein the logic is to generate a non-default voltage condition on the serial bus in the second power mode (e.g., in the low-power state).

11. The replaceable print apparatus component of any preceding clause, wherein the logic comprises serial bus interfaces including data, clock, power, and/or ground (e.g. forming the serial bus interface of the replaceable print apparatus component), in particular whereby the logic is configured to generate a low voltage condition on the data interface in response to a command associated with the second power mode (i.e., a command of the type for which the logic is to transition to the second power mode, e.g., in response to the second command) for a second duration based on a time period (e.g., the dwell time) specified by the respective command, wherein the second duration is, e.g., equal to or different from the first duration, and generate a low-power state on an interface other than the data interface, in response to said command associated with the second power mode (e.g., the second command) for a time period (e.g., the dwell time) specified in the said command, e.g., the first duration.

12. The replaceable print apparatus component of any preceding clause, wherein the logic, in response to a command associated with the second power mode (e.g., in response to the second command), is to generate a non-default voltage condition on a line of the serial bus during a first point in time and during a second point in time, the first and second points in time being separated by a duration based on a time period (e.g., the dwell time) specified by said command, e.g., a third duration equal to or smaller than the second duration.

13. The replaceable print apparatus component of any preceding clause, wherein the logic, in response to a command associated with the second power mode (e.g., in response to the second command), is to generate the second power mode (e.g., the low-power state) on a line of the serial bus during a third point in time and during a fourth point in time, the third and fourth points in time being separated by a first duration based on a time period (e.g., the dwell time) specified by said command, e.g., a fourth duration equal to or smaller than the first duration.

14. Replaceable print apparatus component of any preceding clause, wherein the logic comprises the serial bus interface that is to interface with a serial bus of the host and/or wherein the logic is to:

in response to a first command received from the host apparatus via the serial bus, the first command being associated with a cryptographic operation, execute the cryptographic operation in the first power mode (e.g., in a default-power state); and in response to a second command received from the host apparatus via the serial bus, the second command being associated with a non-cryptographic operation, enter a low-power state (e.g., as the second power mode) associated with the non-cryptographic operation for executing the non-cryptographic operation, wherein a supply current (or power) of the logic in the first power mode is higher than in the second power mode.

15. The replaceable print apparatus component of any preceding clause, wherein the second command (or commands of the type of command associated with the second power mode) specifies a time period and the logic is to exit the second power mode (e.g., the low-power state) upon expiry of a duration based on the time period.

16. The replaceable print apparatus component of any preceding clause, wherein executing the non-cryptographic operation (and/or the operation associated with the second power mode) comprises generating a non-default voltage condition on the serial bus.

17. The replaceable print apparatus component of any preceding clause, wherein the logic further is to enter a standby state upon completion of execution of an operation, the standby state differing from the second power mode (e.g., the low-power state) in at least one of an exit condition for exiting the respective state or mode and a supply current (or consumed power) of the logic in the respective state or mode.

18. The replaceable print apparatus component of any preceding clause, wherein the supply current (or consumed power) of the logic in the first power mode (e.g., in the default-power state) is within a predefined first current (or power) band.

19. The replaceable print apparatus component of any preceding clause, wherein the supply current (or consumed power) of the logic in the second power mode (e.g., in the low-power state) is within a predefined second current (or power) band.

20. The replaceable print apparatus component of any preceding clause, further comprising a current regulator, wherein the current regulator is for example to maintain the supply current (or consumed power) of the logic, e.g., to be within the first current range (or band) in the first power mode (e.g., in the default-power state) and/or within the reduced current range (or second current band) band in the second power mode (e.g., in the low-power state).

21. The replaceable print apparatus component of any preceding clause, wherein the second command (or commands of the type of command associated with the second power mode) is authenticated by the host apparatus and the logic, in response to the respective command, is to confirm authentication of the respective command in the first power mode (e.g., in the default-power state) prior to entering the second power mode (e.g., the low-power state), for example for executing the non-cryptographic operation.

22. The replaceable print apparatus component of any preceding clause, wherein one or both of:

the host is to sample a supply current on the serial bus after issuing a command associated with the first power mode (e.g., the first command) and the logic is to be in the first power mode (e.g., the default-power state) at least at an expected sampling time at which the host is expected to sample the supply current after issuing the respective command; and the host is to sample the supply current on the serial bus after issuing a command associated with the second power mode (e.g., the second command) and the logic is to be in the second power mode (e.g., in the low-power state) at least at an expected sampling time at which the host is expected to sample the supply current after issuing the respective command.

23. The replaceable print apparatus component of any preceding clause, wherein the logic is to, in the first power mode, draw a supply current in a first current range over the serial bus, and, in the second power mode, draw a supply current in a reduced-current range over the serial bus, the reduced-current range being less than, and distanced from, the first current range.

24. The replaceable print apparatus component of clause 23, wherein a center of the reduced-current range is less than 20% of a center of the first current range.

25. The replaceable print apparatus component of any preceding clause, wherein the logic is further to, depending on the type of command sent to the address associated with the logic, transition to either the first power mode, the second power mode or a third power mode, and in the third power mode, draw a supply current in a broadened current range over the serial bus, the broadened current range being broader than the first current range and the reduced-current range and extending at least between the first current range and the reduced-current range.

26. The replaceable print apparatus component of clause 25, wherein one or both of the first and second power modes are regulated power modes in which the supply current drawn by the logic over the serial bus is regulated and the third power mode is an unregulated power mode in which the supply current drawn by the logic over the serial bus is unregulated.

27. The replaceable print apparatus component of any preceding clause, wherein the logic is to:

draw the supply current in the first power mode for a duration based on a time period specified in the command sent to the address associated with the logic; and/or draw the supply current in the second power mode for a duration based on a time period specified in the command sent to the address associated with the logic.

The logic as defined in any one of the preceding clauses may also be provided separate from the replaceable print apparatus component and/or the serial bus interface (e.g., as an independent unit or device), for example as logic for association with a replaceable print apparatus component, wherein the logic may comprise the serial bus interface in some examples.

The description is not intended to be exhaustive or limiting to any of the examples described above. The secure controller for a replaceable print apparatus component, the circuitry for association with a replaceable print apparatus component, the replaceable print apparatus component and the methods disclosed herein can be implemented in various ways and with many modifications without altering the underlying basic properties.

What is claimed is:

1. A secure controller for a replaceable print apparatus component, wherein the controller is to perform secure communication with a host apparatus via a serial data bus, wherein the controller comprises a memory storing a cryptographic key, wherein the controller is to perform secure communication by one or both of (i) generating authenticated cryptographic responses to the host apparatus using the cryptographic key and (ii) validating authenticated messages from the host apparatus using the cryptographic key, wherein the controller is to:

in response to a first command from the host apparatus, execute a first operation associated with the first command, wherein the first operation comprises at least one of: computing a session key, generating a session key identifier, generating a message authentication code, or determining a response to a cryptographic challenge, wherein the controller is to consume power within a first range during execution of the first operation, wherein the controller is to maintain the power consumption of the controller within the first range during the execution of the first operation by one or both of smoothing the power consumption and jamming the power consumption; and in response to a second command from the host apparatus specifying a dwell time, wherein the second command is associated with a non-cryptographic operation comprising performing a physical measurement of the replaceable print apparatus component, transition to a low-power state and consume power within a second range in the low-power state for a first duration based on the dwell time, the second range being below the first range, and maintain the power consumption within the second range by regulating a supply current drawn by the controller during the first duration, wherein an upper limit of the second range is less than a lower limit of the first range.

2. The secure controller of claim 1, wherein a standard deviation of the power consumption of the controller during the execution of the first operation is less than 20% of an average power consumption of the controller during the execution of the first operation, or wherein an average power consumption of the controller in the low-power state is less than 20% of the average power consumption of the controller during the execution of the first operation, wherein the average power consumption of the controller in the low-power state is within the second range and the average power consumption of the controller during the execution of the first operation is within the first range.

3. The secure controller of claim 1, wherein the upper limit of the second range is less than 50% of the lower limit of the first range.

4. The secure controller of claim 1, comprising a timer having a frequency that is independent of a clock frequency on the serial data bus, wherein the controller is configured to run the timer during the low-power state to determine when the first duration based on the dwell time has elapsed.

5. The secure controller of claim 1, wherein the low-power state is a low-power monitoring state for monitoring for expiry of the first duration based on the dwell time specified in the second command, and wherein the controller is to generate a non-default voltage condition on the serial data bus in the low-power state while consuming power within the second range.

6. The secure controller of claim 1, wherein the controller comprises serial bus interfaces including data, clock, power, and/or ground, whereby the controller is configured to generate a low voltage condition on the data interface in
response to the second command specifying the dwell
time for a second duration based on the dwell time of
the second command, wherein the second duration is
equal to or different from the first duration, and generate the low-power state on an interface other than
the data interface, in response to the second command
for the first duration, wherein the controller consumes
power within the second range during the low-power
state.

7. The secure controller of claim 1, wherein the controller,
in response to the second command specifying the dwell
time, is to generate (i) a non-default voltage condition on a
line of the serial data bus during a first point in time and
during a second point in time, the first and second points in
time being separated by a duration based on the dwell time
or (ii) the low-power state on a line of the serial data bus
during a third point in time and during a fourth point in time,
the third and fourth points in time being separated by a
duration based on the dwell time, wherein the controller
consumes power within the second range during the low-
power state.

8. Circuitry for association with a replaceable print appa-
ratus component, the circuitry comprising a serial data bus
interface that is to interface with a serial data bus of a host
apparatus, wherein the circuitry comprises a memory storing
a cryptographic key, wherein the circuitry is to perform
secure communication by one or both of (i) generating
authenticated cryptographic responses to the host apparatus
using the cryptographic key and (ii) validating authenticated
messages from the host apparatus using the cryptographic
key, wherein the circuitry is to:

in response to a first command received from the host
apparatus via the serial data bus, the first command
being associated with a cryptographic operation,
execute the cryptographic operation in a default-power
state, wherein the cryptographic operation comprises at
least one of: computing a session key, generating a
session key identifier, generating a message authenti-
cation code, or determining a response to a crypto-
graphic challenge, wherein the circuitry is to consume
power within a first range during execution of the
cryptographic operation, wherein the circuitry is to
maintain the power consumption of the circuitry within
the first range during the execution of the cryptographic
operation by one or both of smoothing the power
consumption and jamming the power consumption; and in response to a second command received from the host
apparatus via the serial data bus specifying a dwell
time, the second command being associated with a
non-cryptographic operation comprising performing a
physical measurement of the replaceable print appara-
tus component, enter a low-power state associated with
the non-cryptographic operation for executing the non-
cryptographic operation and consume power within a
second range in the low-power state for a first duration
based on the dwell time, wherein the second range is
below the first range, and maintain the power consump-
tion within the second range by regulating a supply
current drawn by the circuitry during the first duration,
wherein an upper limit of the second range is less than
a lower limit of the first range.

9. The circuitry of claim 8, wherein the second command
specifies a time period corresponding to the dwell time and
the circuitry is to exit the low-power state upon expiry of a duration based on the time period, wherein the circuitry
consumes power within the second range during the low-
power state.

10. The circuitry of claim 8, wherein the circuitry further
is to enter a standby state upon completion of execution of
an operation, the standby state differing from the low-power
state in at least one of an exit condition for exiting the
respective state and a supply current of the circuitry in the
respective state, wherein the low-power state is associated
with the non-cryptographic operation and the circuitry con-
sumes power within the second range in the low-power state.

11. The circuitry of claim 8, wherein the supply current of
the circuitry in the default-power state is within a predefined
first current band corresponding to the first range, and
wherein the supply current of the circuitry in the low-power
state is within a predefined second current band correspond-
ing to the second range, wherein an upper limit of the second
current band is less than a lower limit of the first current
band.

12. The circuitry of claim 11, further comprising a current
regulator, wherein the current regulator is to maintain the
supply current of the circuitry to be within the predefined
first current band corresponding to the first range in the
default-power state and/or within the predefined second
current band corresponding to the second range in the
low-power state, wherein the upper limit of the second
current band is less than the lower limit of the first current
band.

13. The circuitry of claim 8, wherein the second command
specifying the dwell time is authenticated by the host
apparatus and the circuitry, in response to the second com-
mand, is to confirm authentication of the second command
in the default-power state prior to entering the low-power
state for executing the non-cryptographic operation, wherein
the circuitry consumes power within the second range in the
low-power state for the first duration based on the dwell
time.

14. The circuitry of claim 8, wherein one or both of:

the host apparatus is to sample a supply current on the
serial data bus after issuing the first command associ-
ated with the cryptographic operation and the circuitry
is to be in the default-power state consuming power
within the first range at least at an expected sampling
time at which the host apparatus is expected to sample
the supply current after issuing the first command; and the host apparatus is to sample the supply current on the
serial data bus after issuing the second command
specifying the dwell time and the circuitry is to be in
the low-power state consuming power within the sec-
ond range at least at an expected sampling time at
which the host apparatus is expected to sample the
supply current after issuing the second command,
wherein the upper limit of the second range is less than
the lower limit of the first range.

15. A replaceable print apparatus component comprising:

a serial bus interface to communicate with a host over a
serial bus; and logic, wherein the logic comprises a memory storing a
cryptographic key, wherein the logic is to perform
secure communication by one or both of (i) generating
authenticated cryptographic responses to the host using
the cryptographic key and (ii) validating authenticated
messages from the host using the cryptographic key, wherein the logic, in response to a command sent by the
host over the serial bus to an address associated with
the logic, is to:

depending on a type of the command sent to the address associated with the logic, selectively transition to either a first power mode or a second power mode for executing an operation associated with the received command, wherein the operation comprises at least one of: computing a session key, generating a session key identifier, generating a message authentication code, or determining a response to a cryptographic challenge when in the first power mode, wherein the command specifies a dwell time when associated with the second power mode, wherein the second power mode is associated with a non-cryptographic operation comprising performing a physical measurement of the replaceable print apparatus component, wherein the logic is to consume power within a first range during the first power mode, wherein the logic is to maintain the power consumption of the logic within the first range during the first power mode by one or both of smoothing the power consumption and jamming the power consumption and consume power within a second range in the second power mode for a first duration based on the dwell time, the second range being below the first range, and maintain the power consumption within the second range by regulating a supply current drawn by the logic during the first duration, wherein an upper limit of the second range is less than a lower limit of the first range.

16. The replaceable print apparatus component of claim 15, wherein the logic is to,
   in the first power mode, draw a supply current in a first current range corresponding to the first range over the serial bus, and,
   in the second power mode, draw a supply current in a reduced-current range corresponding to the second range over the serial bus, the reduced-current range being less than, and distanced from, the first current range, wherein an upper limit of the reduced-current range is less than a lower limit of the first current range, wherein a center of the reduced-current range is less than 20% of a center of the first current range.

17. The replaceable print apparatus component of claim 16, wherein the logic is further to,
   depending on the type of command sent to the address associated with the logic, transition to either the first power mode, the second power mode or a third power mode, and
   in the third power mode, draw a supply current in a broadened current range over the serial bus, the broadened current range being broader than the first current range corresponding to the first range and the reduced-current range corresponding to the second range and extending at least between the first current range and the reduced-current range, wherein the upper limit of the reduced-current range is less than the lower limit of the first current range.

18. The replaceable print apparatus component of claim 17, wherein one or both of the first and second power modes are regulated power modes in which the supply current drawn by the logic over the serial bus is regulated and the third power mode is an unregulated power mode in which the supply current drawn by the logic over the serial bus is unregulated, wherein the first power mode corresponds to the first range and the second power mode corresponds to the second range, wherein the upper limit of the second range is less than the lower limit of the first range.

19. The replaceable print apparatus component of claim 15, wherein the logic is to:
   draw the supply current within the first range in the first power mode for a duration based on a time period specified in the command sent to the address associated with the logic; and/or
   draw the supply current within the second range in the second power mode for a duration based on a time period specified in the command sent to the address associated with the logic, wherein the upper limit of the second range is less than the lower limit of the first range.

* * * * *